US009142154B2

(12) United States Patent
Kuo et al.

(10) Patent No.: US 9,142,154 B2
(45) Date of Patent: Sep. 22, 2015

(54) ELECTROPHORETIC DISPLAY SYSTEM

(71) Applicant: Au Optronics Corporation, Hsinchu (TW)

(72) Inventors: Ping-Sheng Kuo, Tainan (TW); Keh-Long Hwu, Hsinchu County (TW); Chih-Cheng Chan, Taipei (TW); Yung-Hsiang Lan, New Taipei (TW); Chih-Yu Yu, Hualien County (TW)

(73) Assignee: Au Optronics Corporation, Hsinchu (TW)

( * ) Notice: Subject to any disclaimer, the term of this patent is extended or adjusted under 35 U.S.C. 154(b) by 229 days.

(21) Appl. No.: 13/854,152

(22) Filed: Apr. 1, 2013

(65) Prior Publication Data

US 2014/0062980 A1 Mar. 6, 2014

(30) Foreign Application Priority Data

Aug. 31, 2012 (TW) ............................ 101131786 A

(51) Int. Cl.

*G06F 3/038* (2013.01)
*G09G 3/20* (2006.01)
*G09G 3/34* (2006.01)

(52) U.S. Cl.

CPC .................. *G09G 3/20* (2013.01); *G09G 3/344* (2013.01); *G09G 2310/0275* (2013.01); *G09G 2310/0286* (2013.01); *G09G 2310/0289* (2013.01)

(58) Field of Classification Search

CPC .......... G09G 2310/027; G09G 3/3688; G09G 2370/08; G09G 2300/08; G09G 2310/0275; G09G 2310/0286; G09G 2310/0289; G09G 3/20; G09G 3/34; G09G 3/344
USPC ............................ 345/98, 100, 107, 204, 208
See application file for complete search history.

(56) References Cited

U.S. PATENT DOCUMENTS 4,851,827 A * 7/1989 Nicholas ......................... 345/93
4,931,787 A * 6/1990 Shannon ......................... 345/93

(Continued)

FOREIGN PATENT DOCUMENTS

CN 101345016 1/2009
CN 102201204 9/2011

(Continued)

OTHER PUBLICATIONS

"Office Action of China Counterpart Application", issued on Apr. 1, 2014, p. 1-p. 6.

(Continued)

*Primary Examiner* — Lun-Yi Lao
*Assistant Examiner* — Peter D McLoone
(74) *Attorney, Agent, or Firm* — Jianq Chyun IP Office

(57) ABSTRACT

An electrophoretic display system includes an electrophoretic display panel, a timing controller, a data driver, and a gate driver. The data driver includes a first serial-to-parallel converter and a data converter. The first serial-to-parallel converter receives a plurality of first series data and converts the first series data into a plurality of second series data. The quantity of the second series data is more than the quantity of the first series data. The data converter receives the second series data and is electrically connected to the electrophoretic display panel. Besides, the data converter converts the second series data into display voltages, and the quantity of the display voltages is more than the quantity of the second series data. The gate driver is electrically connected to the electrophoretic display panel and the timing controller and controlled by the timing controller to provide gate driving voltages to the electrophoretic display panel.

11 Claims, 7 Drawing Sheets

(56) References Cited

U.S. PATENT DOCUMENTS

| | | | | |
|---|---|---|---|---|
| 5,095,304 | A * | 3/1992 | Young | 345/92 |
| 5,335,023 | A * | 8/1994 | Edwards | 348/800 |
| 5,892,504 | A * | 4/1999 | Knapp | 345/204 |
| 6,407,730 | B1 | 6/2002 | Hori | |
| 6,512,469 | B1 * | 1/2003 | Azami et al. | 341/100 |
| 7,049,983 | B2 * | 5/2006 | Azami et al. | 341/100 |
| 7,259,740 | B2 * | 8/2007 | Haga et al. | 345/98 |
| 8,035,132 | B2 * | 10/2011 | Haga et al. | 257/204 |
| 8,179,387 | B2 * | 5/2012 | Shin et al. | 345/208 |
| 8,274,468 | B2 | 9/2012 | Hori | |
| 8,638,285 | B2 * | 1/2014 | Nose et al. | 345/100 |
| 8,674,924 | B2 * | 3/2014 | Nose | 345/100 |
| 2003/0067434 | A1 * | 4/2003 | Haga et al. | 345/98 |
| 2006/0237727 | A1 * | 10/2006 | Haga et al. | 257/72 |
| 2007/0057905 | A1 * | 3/2007 | Johnson et al. | 345/107 |
| 2008/0143700 | A1 * | 6/2008 | Shin et al. | 345/208 |
| 2009/0015519 | A1 | 1/2009 | Hori | |
| 2010/0315406 | A1 * | 12/2010 | Nose et al. | 345/212 |
| 2011/0032235 | A1 * | 2/2011 | Nose | 345/211 |
| 2012/0268442 | A1 | 10/2012 | Kuo et al. | |
| 2013/0147699 | A1 * | 6/2013 | Seo et al. | 345/88 |
| 2013/0257847 | A1 * | 10/2013 | Lee et al. | 345/213 |

FOREIGN PATENT DOCUMENTS

| | | |
|---|---|---|
| TW | 521232 | 2/2003 |
| TW | 201243797 | 11/2012 |

OTHER PUBLICATIONS

"Office Action of Taiwan Counterpart Application", issued on Aug. 21, 2014, p. 1-p. 6.

* cited by examiner

ELECTROPHORETIC DISPLAY SYSTEM

CROSS-REFERENCE TO RELATED APPLICATION

This application claims the priority benefit of Taiwan application serial no. 101131786, filed on Aug. 31, 2012. The entirety of the above-mentioned patent application is hereby incorporated by reference herein and made a part of this specification.

BACKGROUND OF THE INVENTION

1. Field of the Invention

The invention relates to a display system, and in particular to an electrophoretic display system.

2. Description of Related Art

With the continual research on and the recent advancement of various display technologies, displays, such as electrophoretic displays (EPD), liquid crystal displays (LCD), plasma display panels (PDP), and organic light-emitting diode (OLED) displays, have been gradually commercialized and applied to devices in different sizes and with different areas. Besides, the popularity of portable electronic devices calls the attention of the market to flexible displays, e.g., e-paper, e-book, and so on.

In general, if a flexible display with high resolution is to be driven, a timing controller is required to provide series frame data to a data driver through a relatively large number of data lines, so as to drive the display panel. Thereby, the influence of traces undoubtedly lessens the likelihood of reducing the volume of the flexible display, such that the flexible display may not be able to satisfy the requirement for compactness and miniaturization.

In another aspect, a display voltage is output from the data driver to the display panel, so as to drive the display panel to display corresponding frames. Hence, whether the display panel may accurately display the frames or not is determined by the driving capability (e.g., the amount of the output current) of the data driver. Due to the demand for driving capability, the chip area of the data driver may be significant; namely, the hardware costs of the data driver may be considerable.

SUMMARY OF THE INVENTION

The invention is directed to an electrophoretic display system in which the number of data lines between a timing controller and a data driver may be reduced due to multiple stages of serial-to-parallel conversion, and thereby the circuit area of the data driver may be further reduced.

In an embodiment of the invention, an electrophoretic display system that includes an electrophoretic display panel, a timing controller, a data driver, and a gate driver is provided. The data driver includes a first serial-to-parallel converter and a data converter. The first serial-to-parallel converter is electrically connected to the timing controller, so as to receive a plurality of first series data and convert the first series data into a plurality of second series data. Here, the quantity of the second series data is more than the quantity of the first series data. The data converter is electrically connected to the first serial-to-parallel converter to receive the second series data, and the data driver is electrically connected to the electrophoretic display panel. Besides, the data converter converts the second series data into a plurality of display voltages, and the quantity of the display voltages is more than the quantity of the second series data. The gate driver is electrically connected to the electrophoretic display panel and the timing controller and controlled by the timing controller to provide a plurality of gate driving voltages to the electrophoretic display panel.

According to an embodiment of the invention, a common voltage of the electrophoretic display panel is an alternating voltage.

According to an embodiment of the invention, the data converter includes a plurality of first latch circuits and a plurality of second latch circuits. The first latch circuits are electrically connected to the first serial-to-parallel converter, so as to respectively receive the corresponding second series data and respectively receive a first signal. Each of the first latch circuits respectively latches one of data bits in the second series data according to the corresponding first signal and respectively outputs a first bit voltage. The second latch circuits are electrically connected to the first latch circuits to respectively receive the corresponding first bit voltage and a latch enabling signal. Each of the second latch circuits respectively latches the corresponding first bit voltage according to the latch enabling signal and respectively outputs the corresponding display voltage.

According to an embodiment of the invention, the data converter further includes a plurality of first shift registers for respectively providing the corresponding first signal. The first shift registers are divided into a plurality of groups, and the first signals provided by the first shift registers belonging to the same group are sequentially enabled.

According to an embodiment of the invention, each of the first latch circuits includes a first transistor, a second transistor, a first capacitor, a third transistor, and a fourth transistor. A first end of the first transistor receives the corresponding second series data. A control end of the first transistor receives the corresponding first signal. A first end of the second transistor is electrically connected to a second end of the first transistor. A control end of the second transistor receives an inverted signal of the corresponding first signal. A second end of the second transistor is electrically connected to the first end of the second transistor. The first capacitor is electrically connected between the second end of the first transistor and a ground voltage. A first end of the third transistor receives a system high voltage. A control end of the third transistor is electrically connected to the first end of the third transistor. A second end of the third transistor outputs the corresponding first bit voltage. A first end of the fourth transistor is electrically connected to the second end of the third transistor. A control end of the fourth transistor is electrically connected to the second end of the first transistor. A second end of the fourth transistor receives a system low voltage.

According to an embodiment of the invention, each of the second latch circuits includes a fifth transistor, a sixth transistor, a second capacitor, a seventh transistor, an eighth transistor, a third capacitor, and a ninth transistor. A first end of the fifth transistor is electrically connected to the corresponding first latch circuits to receive the corresponding first bit voltage. A control end of the fifth transistor receives the latch enabling signal. A first end of the sixth transistor is electrically connected to a second end of the fifth transistor, and a control end of the sixth transistor receives an inverted signal of the latch enabling signal. A second end of the sixth transistor is electrically connected to the first end of the sixth transistor. The second capacitor is electrically connected between the second end of the fifth transistor and the ground voltage. A first end of the seventh transistor receives the system high voltage. A second end of the seventh transistor outputs the corresponding display voltage. A first end of the eighth transistor is electrically connected to the second end of the seventh transistor. A control end of the eighth transistor is electrically connected to the second end of the fifth transistor. A second end of the eighth transistor receives the system low voltage. The third capacitor is electrically connected between a control end of the seventh transistor and the second end of the seventh transistor. A first end of the ninth transistor receives the system high voltage. A control end of the ninth transistor is electrically connected to the first end of the ninth transistor. A second end of the ninth transistor is electrically connected to the control end of the seventh transistor.

According to an embodiment of the invention, the timing controller sets the first series data within a vertical blank period, such that the data bit received by each of the first latch circuits respectively corresponds to the system low voltages.

According to an embodiment of the invention, a common voltage of the electrophoretic display panel is an direct current voltage.

According to an embodiment of the invention, the data converter includes a plurality of third latch circuits, a plurality of fourth latch circuits, and a plurality of decoding circuits. The third latch circuits are electrically connected to the first serial-to-parallel converter, so as to respectively receive the corresponding second series data. Each of the third latch circuits respectively receives one of second signals. Besides, each of the third latch circuits respectively latches a first data bit and a second data bit of the second series data according to the corresponding second signal and respectively outputs a second bit voltage and a third bit voltage. The fourth latch circuits are electrically connected to the third latch circuits, so as to respectively receive the corresponding second bit voltage and the corresponding third bit voltage. The fourth latch circuits receive a latch enabling signal. Besides, each of the fourth latch circuits respectively latches the corresponding second bit voltage and the corresponding third bit voltage according to the latch enabling signal and respectively outputs a first control signal and a second control signal. The decoding circuits are electrically connected to the fourth latch circuits to receive the corresponding first control signal and the corresponding second control signal. Each of the decoding circuits receives a positive display voltage, the common voltage, and a negative display voltage. Besides, each of the decoding circuits selects one of the positive display voltage, the common voltage, and the negative display voltage as the corresponding display voltage according to the corresponding first control signal and the corresponding second control signal.

According to an embodiment of the invention, the data converter further includes a plurality of second shift registers for respectively providing the corresponding second signal. The second shift registers are divided into a plurality of groups, and the second signals provided by the second shift registers belonging to the same group are sequentially enabled.

According to an embodiment of the invention, each of the third latch circuits includes a tenth transistor, an eleventh transistor, a fourth capacitor, a first inverter, a second inverter, a twelfth transistor, a thirteenth transistor, a fifth capacitor, a third inverter, and a fourth inverter. A first end of the tenth transistor receives the corresponding first data bit. A control end of the tenth transistor receives the corresponding second signal. A first end of the eleventh transistor is electrically connected to a second end of the tenth transistor. A control end of the eleventh transistor receives an inverted signal of the corresponding second signal. The second end of the eleventh transistor is electrically connected to the first end of the eleventh transistor. The fourth capacitor is electrically connected between the second end of the tenth transistor and a ground voltage. An input end of the first inverter is electrically connected to the second end of the tenth transistor. An input end of the second inverter is electrically connected to an output end of the first inverter. An output end of the second inverter outputs the corresponding second bit voltage. A first end of the twelfth transistor receives the corresponding second data bit. A control end of the twelfth transistor receives the corresponding second signal. A first end of the thirteenth transistor is electrically connected to a second end of the twelfth transistor. A control end of the thirteenth transistor receives an inverted signal of the corresponding second signal. A second end of the thirteenth transistor is electrically connected to the first end of the twelfth transistor. The fifth capacitor is electrically connected between the second end of the twelfth transistor and the ground voltage. An input end of the third inverter is electrically connected to the second end of the twelfth transistor. An input end of the fourth inverter is electrically connected to an output end of the third inverter. An output end of the fourth inverter outputs the corresponding third bit voltage.

According to an embodiment of the invention, each of the fourth latch circuits includes a fourteenth transistor, a fifteenth transistor, a sixth capacitor, a fifth inverter, a sixth inverter, a sixteenth transistor, a seventeenth transistor, a seventh capacitor, a seventh inverter, and an eighth inverter. A first end of the fourteenth transistor receives the corresponding second bit voltage. A control end of the fourteenth transistor receives the latch enabling signal. A first end of the fifteenth transistor is electrically connected to a second end of the fourteenth transistor. A control end of the fifteenth transistor receives an inverted signal of the latch enabling signal. A second end of the fifteenth transistor is electrically connected to the first end of the fifteenth transistor. The sixth capacitor is electrically connected between the second end of the fourteenth transistor and the ground voltage. An input end of the fifth inverter is electrically connected to the second end of the fourteenth transistor. An output end of the fifth inverter outputs an inverted signal of the corresponding first control signal. An input end of the sixth inverter is electrically connected to the output end of the fifth inverter. An output end of the sixth inverter outputs the corresponding first control signal. A first end of the sixteenth transistor receives the corresponding third bit voltage. A control end of the sixteenth transistor receives the latch enabling signal. A first end of the seventeenth transistor is electrically connected to a second end of the sixteenth transistor. A control end of the seventeenth transistor receives an inverted signal of the latch enabling signal. A second end of the seventeenth transistor is electrically connected to the first end of the seventeenth transistor. The seventh capacitor is electrically connected between the second end of the sixteenth transistor and the ground voltage. An input end of the seventh inverter is electrically connected to the second end of the sixteenth transistor. An output end of the seventh inverter outputs an inverted signal of the corresponding second control signal. An input end of the eighth inverter is electrically connected to the output end of the seventh inverter. An output end of the eighth inverter outputs the corresponding second control signal.

According to an embodiment of the invention, each of the decoding circuits includes a first NAND gate, a ninth inverter, a first boost circuit, an eighteenth transistor, an eighth capacitor, a second NAND gate, a tenth inverter, a second boost circuit, a nineteenth transistor, a third NAND gate, an eleventh inverter, a third boost circuit, and a twentieth transistor. A first input end of the first NAND gate receives the inverted signal of the first control signal. A second input end of the first NAND gate receives the inverted signal of the second control signal. An output end of the first NAND gate outputs an inverted signal of a first boost control signal. An input end of the ninth inverter is electrically connected to the output end of the first NAND gate, and an output end of the ninth inverter outputs the first boost control signal. The first boost circuit is electrically connected to the input end and the output end of the ninth inverter, so as to output a first switch control voltage according to the first boost control signal and its inverted signal. A first end of the eighteenth transistor receives the positive display voltage. A control end of the eighteenth transistor is electrically connected to the first boost circuit to receive the first switch control voltage. The eighth capacitor is electrically connected between a second end of the eighteenth transistor and the ground voltage to provide the corresponding display voltage. A first input end of the second NAND gate receives the first control signal. A second input end of the second NAND gate receives the inverted signal of the second control signal. An output end of the second NAND gate outputs an inverted signal of a second boost control signal. An input end of the tenth inverter is electrically connected to the output end of the second NAND gate, and an output end of the tenth inverter outputs the second boost control signal. The second boost circuit is electrically connected to the input end and the output end of the tenth inverter, so as to output a second switch control voltage according to the second boost control signal and its inverted signal. A first end of the nineteenth transistor receives the common voltage. A control end of the nineteenth transistor is electrically connected to the second boost circuit to receive the second switch control voltage. A second end of the nineteenth transistor is electrically connected to a second end of the eighteenth transistor. A first input end of the third NAND gate receives the inverted signal of the first control signal. A second input end of the third NAND gate receiving the second control signal. An output end of the third NAND gate outputs an inverted signal of a third boost control signal. An input end of the eleventh inverter is electrically connected to the output end of the third NAND gate, and an output end of the eleventh inverter outputs the third boost control signal. The third boost circuit is electrically connected to the input end and the output end of the eleventh inverter, so as to output a third switch control voltage according to the third boost control signal and its inverted signal. A first end of the twentieth transistor receives the negative display voltage. A control end of the twentieth transistor is electrically connected to the third boost circuit to receive the third switch control voltage. A second end of the twentieth transistor is electrically connected to the second end of the eighteenth transistor.

According to an embodiment of the invention, each of the first boost circuit, the second boost circuit, and the third boost circuit includes a ninth capacitor, a first switch, a second switch, a third switch, a fourth switch, and a fifth switch. A first end of the first switch receives a system high voltage. A second end of the first switch is electrically connected to a first end of the ninth capacitor. The first switch is controlled by the inverted signal of the first boost control signal, the inverted signal of the second boost control signal, or the inverted signal of the third boost control signal and is switched on. A first end of the second switch receives the system high voltage, and a second end of the second switch is electrically connected to a second end of the ninth capacitor. The second switch is controlled by the first boost control signal, the second boost control signal, or the third boost control signal and is switched on. A first end of the third switch is electrically connected to the first end of the ninth capacitor. A second end of the third switch provides the first switch control voltage, the second switch control voltage, or the third switch control voltage. The third switch is controlled by the first boost control signal, the second boost control signal, or the third boost control signal and is switched on. A first end of the fourth switch is electrically connected to the second end of the ninth capacitor. A second end of the fourth switch receives the ground voltage. The fourth switch is controlled by the inverted signal of the first boost control signal, the inverted signal of the second boost control signal, or the inverted signal of the third boost control signal and is switched on. A first end of the fifth switch receives the negative display voltage. A second end of the fifth switch is electrically connected to the second end of the third switch. The fifth switch is controlled by the inverted signal of the first boost control signal, the inverted signal of the second boost control signal, or the inverted signal of the third boost control signal and is switched on.

According to an embodiment of the invention, the timing controller sets the first series data within a vertical blank period, such that each of the decoding circuits in turns outputs the positive display voltage, the common voltage, and the negative display voltage.

As described above, an electrophoretic display system is provided in an embodiment of the invention, and the data driver of the electrophoretic display system receives data through serial-to-parallel conversion. Thereby, the timing controller may transmit data through a relatively small number of data lines, the overall circuit area of the electrophoretic display system may be effectively reduced, and the hardware costs may be reduced as well. Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
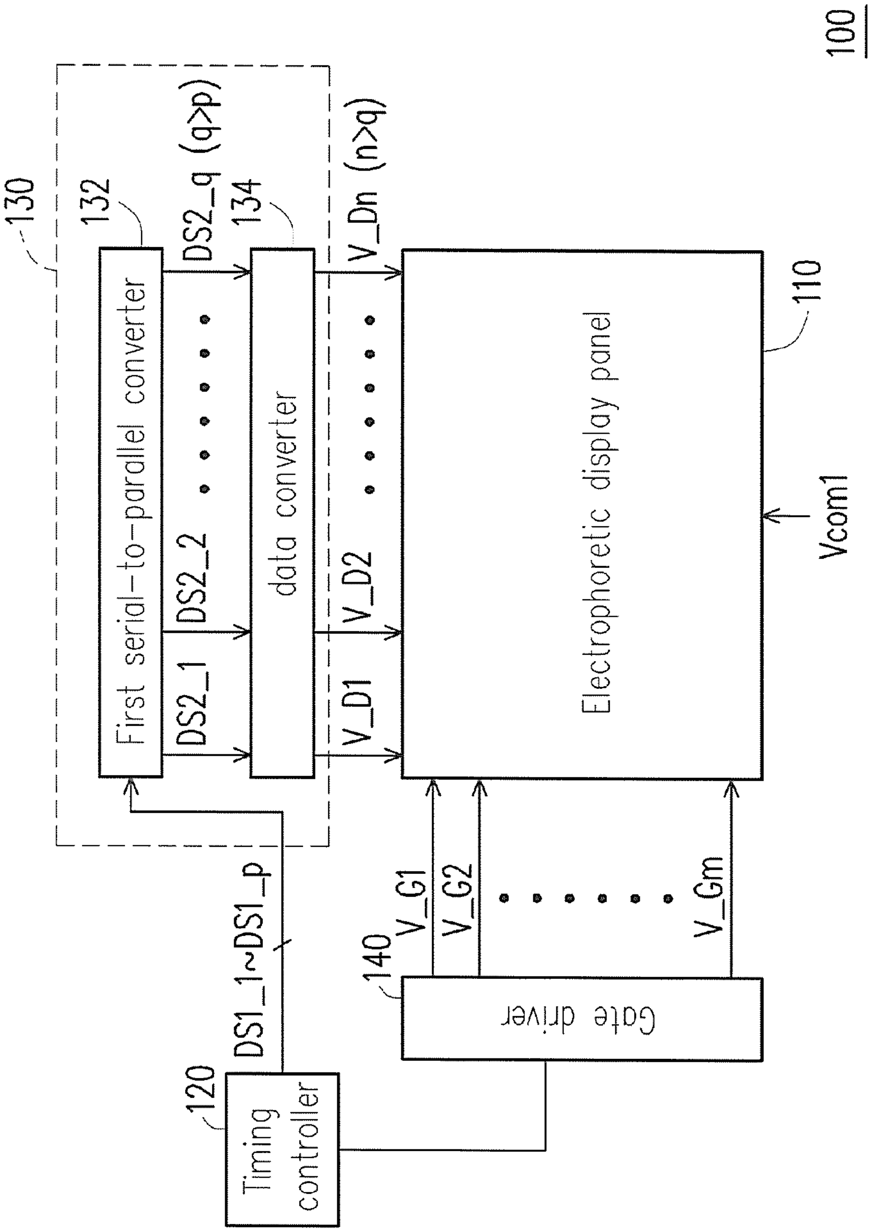
FIG. 1 is a schematic view illustrating an electrophoretic display system according to an embodiment of the invention.

FIG. 1 is a schematic view illustrating an electrophoretic display system according to an embodiment of the invention. With reference to FIG. 1, an electrophoretic display system 100 described in the present embodiment includes an electrophoretic display panel 110, a timing controller 120, a data driver 130, and a gate driver 140. In the present embodiment, the data driver 130 receives first series data DS1_1~DS1_*p* provided by the timing controller 120 and converts the first series data DS1_1~DS1$_1$3 into corresponding display voltages V_D1~V_Dn to drive the electrophoretic display panel 110. The gate driver 140 is electrically connected to the electrophoretic display panel 110 and the timing controller 120 and controlled by the timing controller 120 to provide a plurality of gate driving voltages V_G1~V_Gm to the electrophoretic display panel 110. The electrophoretic display panel 110 receives a common voltage Vcom1. Here, m, n, and p are positive integers, p is smaller than n, and m, n, and p may be adjusted based on actual design requirements.

In particular, the gate driver 140 sequentially enables the gate driving voltages V_G1~V_Gm output by the gate driver 140, so as to switch on each row of pixels (not shown) of the electrophoretic display panel 110. Thereby, the data driver 130 may correspondingly output the display voltages V_D1~V_Dn to the pixels (not shown) that are switched on, and the corresponding brightness (i.e., the gray scale value) may be shown by each pixel (not shown) according to the voltage difference between the corresponding display voltages (e.g., V_D1~V_Dn) and the common voltage Vcom1 and the driving time, so as to display images.

In the present embodiment, the data driver 130 includes a first serial-to-parallel converter 132 and a data converter 134. The first serial-to-parallel converter 132 is electrically connected to the timing controller 120, so as to receive a plurality of first series data DS1_1~DS1_*p* and convert the first series data DS1_1~DS1_*p* into a plurality of second series data DS2_1~DS2_*q*. Here, q is a positive integer and is greater than p; namely, the quantity of the second series data DS2_1~DS2_*q* is more than the quantity of the first series data DS1_1~DS1_*p*. For instance, when the serial-to-parallel conversion bit ratio of the first serial-to-parallel converter 132 is 1:4, the quantity of the second series data DS2_1~DS2_*q* is four times the quantity of the first series data DS1_1~DS1_*p*.

The data converter 134 is electrically connected to the first serial-to-parallel converter 132 to receive the second series data DS2_1~DS2_*q*. The data driver 134 is electrically connected to the electrophoretic display panel 110 and converts the second series data DS2_1~DS2_*q* into the display voltages V_D1~V_Dn to drive the electrophoretic display panel 110. Here, n is a positive integer and is greater than q, i.e., the quantity of the display voltages V_D1~V_Dn is more than the quantity of the second series data DS2_1~DS2_*q*. This indicates that the data converter 134 converts one of the second series data DS2_1~DS2_*q* into some of the display voltages V_D1~V_Dn.

Due to the configuration of the first serial-to-parallel converter 132, the timing controller 120 is capable of transmitting data to the data driver 130 through a relatively small number of data transmission lines, and thereby the data driver 130 is allowed to convert the data and output the display voltages V_D1~V_Dn to drive the electrophoretic display panel 110. As such, the overall circuit area of the electrophoretic display system 100 may be effectively reduced, and the design costs may then be lowered down.

Generally, the common voltage Vcom1 of the electrophoretic display panel 110 may be an alternating current voltage or a direct current voltage, and the driving manner of the common voltage Vcom1 of the electrophoretic display panel 110 may be changed according to the types of the common voltage Vcom1. Both conditions will be respectively exemplified below to explain the design of the electrophoretic display system.

Figure 2:
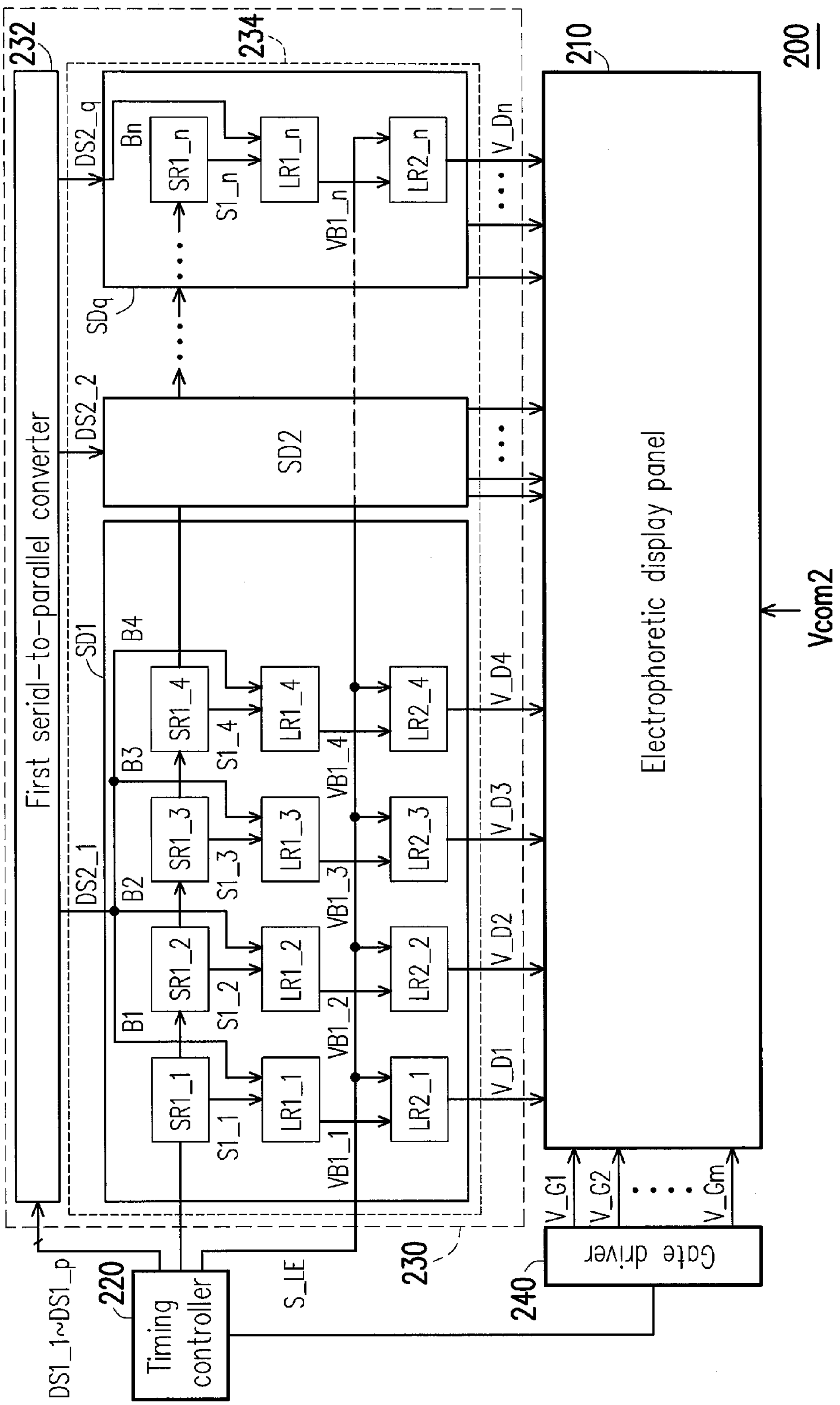
FIG. 2 is a schematic view illustrating an electrophoretic display system according to another embodiment of the invention.

FIG. 2 is a schematic view illustrating an electrophoretic display system according to another embodiment of the invention. With reference to FIG. 2, according to the present embodiment of the invention, a common voltage Vcom2 of the electrophoretic display panel 210 is assumed to be an alternating current voltage. The electrophoretic display system 200 includes the electrophoretic display panel 210, a timing controller 220, a data driver 230, and a gate driver 240. Here, the electrophoretic display panel 210, the timing controller 220, and the gate driver 240 are similar to the electrophoretic display panel 110, the timing controller 120, and the gate driver 140 depicted in FIG. 1 and described in the previous embodiment, and therefore no further explanation is provided hereinafter.

To be specific, when the common voltage Vcom2 is the alternating current voltage, the common voltage Vcom2 may be alternatively at the positive voltage level or at the negative voltage level, and the display voltages V_D1~V_Dn may be correspondingly at the positive voltage level or at the negative voltage level, so as to generate the positive voltage difference, the negative voltage difference, or the zero voltage difference in the electrophoretic display panel 210. Accordingly, the voltage of each of the display voltages V_D1~V_Dn may be determined by one bit, and the data converter 230 may directly output the corresponding display voltages V_D1~V_Dn for driving the electrophoretic display panel 210 even though a decoding circuit is omitted.

The data driver 230 includes a first serial-to-parallel converter 232 and data converter 234, wherein the data converter 234 includes a plurality of first shift registers SR1_1~SR1_*n*, a plurality of first latch circuits LR1_1~LR1_*n*, and a plurality of second latch circuits LR2_1~LR1_*n*. Here, the first shift registers SR1_1~SR1_*n*, the first latch circuits LR1_1~LR1_*n*, and the second latch circuits LR2_1~LR1_*n* may be divided into a plurality of driving channels SD1~SDq (i.e., divided into a plurality of groups), and each of the driving channels SD1~SDq may respectively output the corresponding display voltages (e.g., V_D1~V_Dn) according to the second series data (e.g., DS2_1~DS2_*q*) received by the driving channels SD1~SDq. For instance, the driving channel SD1 outputs the corresponding display voltages V_D1~V_D4 according to the second series data DS2_1 received by the driving channel SD1, and the same principle is applicable to the other driving channels. Since the first serial-to-parallel converter 232 is similar to the first serial-to-parallel converter 132 depicted in FIG. 1 and described in the previous embodiment, no further explanation is provided hereinafter.

According to the present embodiment, the first shift registers SR1_1~SR1_*n* may respectively provide the corresponding one of first signals S1_1~S1_*n* which are sequentially outputted, and the first signals (e.g., S1_1~S1_*n*) are provided by the first shift registers (e.g., SR1_1~SR1_*n*) corresponding to the same driving channels (e.g., SD1~SDq) are sequentially enabled. For instance, one of the first signals S1_1~S1_4 provided by the first shift registers SR1_1~SR1_*n* corresponding to the driving channel SD1 is enabled, and the first signals S1_1~S1_4 are sequentially enabled.

The first latch circuits LR1_1~LR1_*n* are electrically connected to the first serial-to-parallel converter 232, so as to respectively receive the corresponding one of the second series data DS2_1~DS2_*q* and respectively receive the corresponding one of the first signals S1_1~S1_*n*. Here, each of the first latch circuits LR1_1~LR1_*n* respectively latches one of the data bits B1~Bn in the second series data DS2_1~DS2_*q* according to the corresponding one of the first signals S1_1~S1_n and respectively outputs one of the first bit voltages VB1_1~VB1_n. In the present embodiment, each of the first shift registers SR1_1~SR1_n exclusively corresponds to one of the latch circuits LR1_1~LR1_n, so as to provide the first signals S1_1~S1_n as shown in FIG. 2, which should not be construed as a limitation to the invention. In another embodiment, each of the first shift registers (ex. SR1_1~SR1_n) may respectively correspond to a plurality of first latch circuits (ex. LR1_1~LR1_n), and thereby each shift register may simultaneously or sequentially provide the first signals to the first latch circuits, i.e. each of the first shift registers may drive a plurality of first latch circuits, which should not be construed as a limitation to the invention. According to the above-described, the second series data (ex. DS2_1~DS2_q) received by the first latch circuits (ex. LR1_1~LR1_n) which driven by the same first shift register (ex. SR1_1~SR1_n) are different, i.e. the data lines corresponding to the first latch circuits (ex. LR1_1~LR1_n) which driven by the same first shift register (ex. SR1_1~SR1_n) are different, so that a product of amounts of the first shift registers and the data lines are equal to the data resolution (i.e. the amount of the display voltages, such as V_D1~V_Dn.

The second latch circuits LR2_1~LR2_n are electrically connected to the first latch circuits LR1_1~LR1_n to respectively receive the corresponding one of the first bit voltages VB1_1~VB1_n and a latch enabling signal S_LE provided by the timing controller 220. Each of the second latch circuits LR2_1~LR1_n respectively latches the corresponding one of the first bit voltages VB1_1~VB1_n according to the latch enabling signal S_LE and respectively outputs the corresponding one of the display voltages V_D1~V_Dn.

For instance, in the exemplary driving channel SD1, the first shift registers SR1_1~SR1_4 belong to the same group and may respond to the timing signal (not shown) provided by the timing controller 220, so as to generate first signals S1_1~S1_4 that are sequentially enabled. When the first latch circuits LR1_1~LR1_4 respectively latch the data bits B1~B4 transmitted by the driving channel SD1 at different time points, the first latch circuits LR1_1~LR1_4 output the first bit voltages VB1_1~VB1_4 (corresponding to the data bits B1~B4) in parallel to the second latch circuits LR2_1~LR2_4. Here, the first shift registers SR1_1~SR1_4 and the first latch circuits LR1_1~LR1_4 may be considered as one serial-to-parallel converter and may latch the data bits B1~B4 transmitted by the second series data DS2_1 at different time points, and the first bit voltages VB1_1~VB1_4 corresponding to the data bits B1~B4 may be output in parallel.

The second latch circuits LR2_1~LR2_4 respectively latch the corresponding one of the first bit voltages. VB1_1~VB1_4 according to the latch enabling signal S_LE and respectively output the corresponding one of the display voltages V_D1~V_D4 to the electrophoretic display panel 210 in parallel when the latch enabling signal S_LE is enabled. Here, the latch enabling signal S_LE provided by the timing controller 220 is enabled before the gate driving voltages V_G1~V_Gm of the gate driver 240 are enabled; hence, the second latch circuits LR2_1~LR2_4 are allowed to output the corresponding display voltages V_D1~V_D4 to the electrophoretic display panel 210, and thereby the electrophoretic display panel 210 may display corresponding frames.

The way to operate the driving channel SD1 may be applied to the way to operate the other driving channels SD2~SDq based on the descriptions above, and thus no further explanation is provided hereinafter. Besides, the driving channel SD1 described in the present embodiment exemplarily outputs four display voltages V_D1~V_D4, and the number of the first shift registers, the number of the first latch circuits, and the number of the second latch circuits are all set to be four. However, the actual number of the display voltages output by each driving channel may be determined by a designer, and the circuits in each driving channel (e.g. SD1~SDq) may accordingly be changed according to the number of the output driving voltages, which should not be construed as a limitation to the invention.

Figure 3:
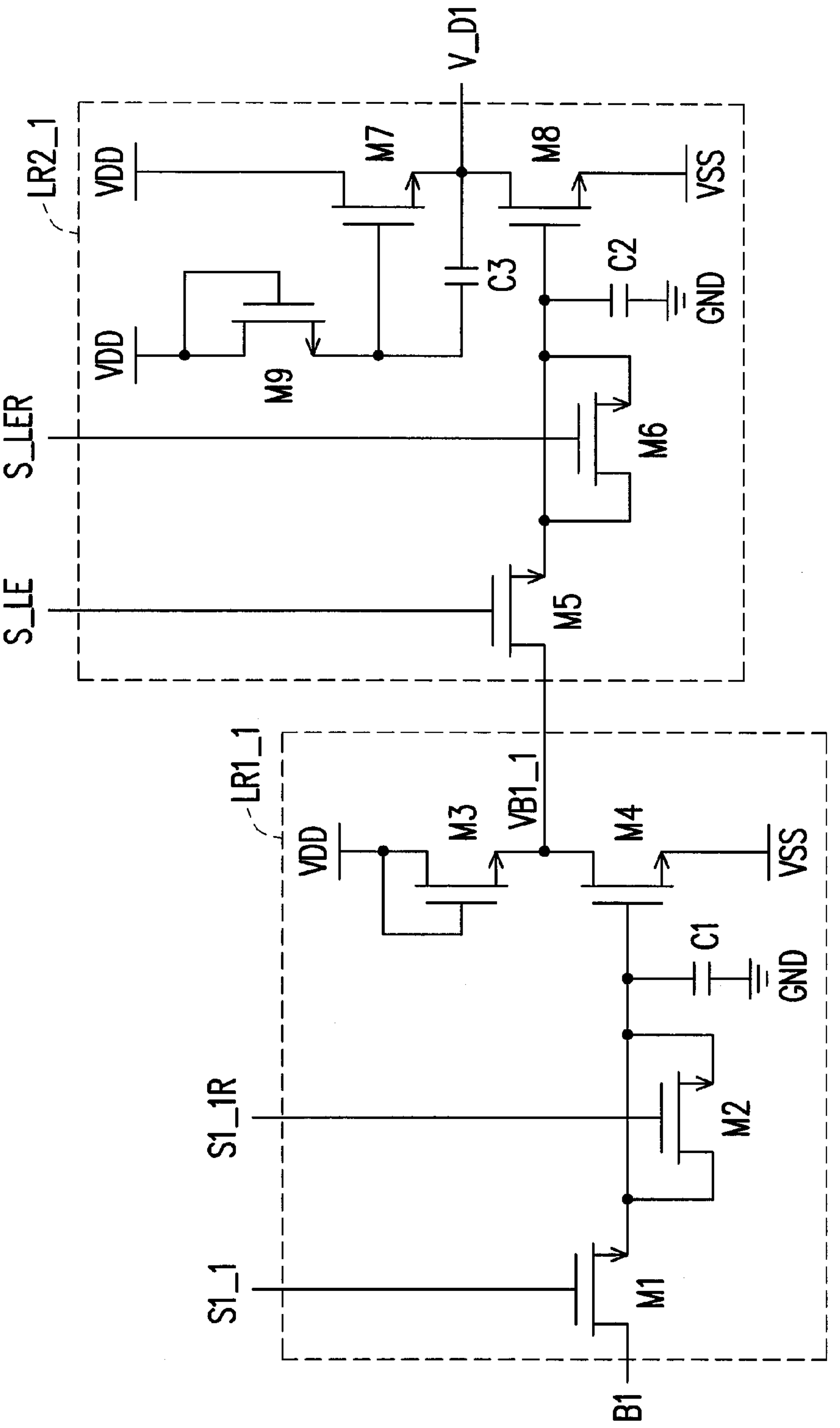
FIG. 3 is a schematic circuitry diagram illustrating a first latch circuit and a second latch circuit according to an embodiment of the invention.

FIG. 3 is a schematic circuitry diagram illustrating a first latch circuit and a second latch circuit according to an embodiment of the invention. With reference to FIG. 2 and FIG. 3, in the present embodiment, the driving channel SD1 exemplarily has the first latch circuit LR1_1 and the second latch circuit LR2_1, and the circuitry structures of the first latch circuits LR1_1~LR1_n and the second latch circuits LR2_1~LR2_n may be referred to as those of the first and second latch circuits LR1_1 and LR2_1.

As shown in FIG. 3, the first latch circuit LR1_1 includes a first transistor M1, a second transistor M2, a first capacitor C1, a third transistor M3, and a fourth transistor M4. The drain (i.e., the first end) of the first transistor M1 receives the second series data DS2_1, and the gate (i.e., the control end) of the first transistor M1 receives the first signal S1_1. When the first transistor M1 is switched on according to the enabled first signal S1_1, the first transistor M1 receives the data bit B1 of the second series data DS2_1.

The drain (i.e., the first end) of the second transistor M2 is electrically connected to the source (i.e., the second end) of the first transistor M1. The gate (i.e. the control end) of the second transistor M2 receives an inverted signal S1_1R of the first signal S1_1. The source (i.e., the second end) of the second transistor M2 is electrically connected to the drain of the second transistor M2. The first capacitor C1 is electrically connected between the source of the first transistor M1 and a ground voltage GND.

The drain (i.e., the first end) of the third transistor M3 receives a system high voltage VDD. The gate (i.e., the control end) of the third transistor M3 is electrically connected to the drain of the third transistor M3. The source (i.e., the second end) of the third transistor M3 outputs a first bit voltage VB1_1. The drain (i.e., the first end) of fourth transistor M4 is electrically connected to the source of the third transistor M3. The gate (i.e., the control end) of the fourth transistor M4 is electrically connected to the source of the first transistor M1. The source (i.e., the second end) of the fourth transistor M4 receives a system low voltage VSS.

The second latch circuit LR2_1 includes a fifth transistor M5, a sixth transistor M6, a second capacitor C2, a seventh transistor M7, an eighth transistor M8, a third capacitor C3, and a ninth transistor M9. The drain (i.e., the first end) of the fifth transistor M5 is electrically connected to the first latch circuit LR1_1 to receive the first bit voltage VB1_1. The gate (i.e., the control end) of the fifth transistor M5 receives the latch enabling signal S_LE. The drain (i.e., the first end) of the sixth transistor M6 is electrically connected to the source (i.e., the second end) of the fifth transistor M5. The gate (i.e. the control end) of the sixth transistor M6 receives an inverted signal S_LER of the latch enabling signal S_LE. The source of the sixth transistor M6 is electrically connected to the drain of the sixth transistor M6. The second capacitor C2 is electrically connected between the second end of the fifth transistor M5 and the ground voltage GND.

The drain (i.e., the first end) of the seventh transistor M7 the system receives the high voltage VDD. The source (i.e., the second end) of the seventh transistor M7 outputs the corresponding display voltage V_D1. The drain (i.e., the first end) of the eighth transistor M8 is electrically connected to the source (i.e., the second end) of the seventh transistor M7. The gate (i.e., the control end) of the eighth transistor M8 is electrically connected to the source of the fifth transistor M5. The source (i.e., the second end) of the eighth transistor M8 receives the system low voltage VSS. The third capacitor C3 is electrically connected between the gate (i.e., the control end) of the seventh transistor M7 and the source of the seventh transistor M7. The drain (i.e., the first end) of the ninth transistor M9 receives the system high voltage VDD. The gate (i.e., the control end) of the ninth transistor M9 is electrically connected to the drain of the ninth transistor M9. The source (i.e., the second end) of the ninth transistor M9 is electrically connected to the gate of the seventh transistor M7.

According to one embodiment, in the second latch circuit LR2_1, the seventh transistor M7, the eighth transistor M8, the ninth transistor M9, and the third capacitor C3 may be considered as a boost inverter.

For instance, assuming the voltage difference between the system high voltage VDD and the ground voltage GND is equal to the voltage difference between the system low voltage VSS and the ground voltage GND, the system high voltage VDD is higher than the ground voltage GND, and the system low voltage VSS is lower than the ground voltage GND.

When the data bit B1 is "0", i.e., when the second series data DS2_1 is at the low voltage level (e.g., VSS), the transistor M4 is not switched on; therefore, the first bit voltage VB1_1 approximately reaches VDD-Vth,M3 (may be considered as being at the high voltage level). When S_LE turns on M5, the transistor M8 is switched on, and the voltage level of the display voltage V_D1 is approximately Vss, such that the voltage across the third capacitor C3 is VDD-Vth,M9-Vss. When the data bit B1 is "1", i.e., when the second series data DS2_1 is at the high voltage level (e.g., the system high voltage VDD), the transistor M4 is switched on; therefore, the first bit voltage VB1_1 approximately reaches Vss (may be considered as being at the low voltage level). When S_LE turns on M5, the transistor M8 is switched off, the gate of M7 is coupled to boost-high by V_D1 through C3 and Cgs,M7, and the voltage level of the display voltage V_D1 is the system high voltage VDD. Besides, the voltage across the third capacitor C3 is roughly a sum of absolute value of the system low voltage VSS and the difference between the system high voltage VDD and the threshold voltage of the transistor M9. Accordingly, the driving capability of the data driver 230 is retained without extending the channel width of all transistors. That is, the circuit area is not expanded.

The electrophoretic display panel 210 is able to display one single frame if a driving action lasts for plural frame periods of time. Hence, the driving voltages V_D1~V_Dn output by the data voltage 230 remain at the high voltage level (e.g., the system high voltage VDD) within plural frame periods of time. However, the Voltage of the gate of the transistor M7 will reduce with time due to currents of the turned-off transistor M9, the gate of transistor M7, and the third capacitor C3. When Voltage of the gate of the transistor M7 is below the difference between the system high voltage VDD and the threshold voltage of the transistor M9, the logic level "1" of V_D1 will be smaller than VDD. In other words, the Voltage of the gate of the transistor M7 can not hold the "boost-height" within plural frame periods of time.

According to the present embodiment, the timing controller 220 may reset the first series data DS1_1~DS1_*p* within a vertical blank (VB) period, such that the data bits B1~Bn received by the first latch circuits LR1_1~LR1_*n* are "0" (e.g., the system low voltage VSS). Thereby, within the VB period, the gate voltage of the transistor M7 may, due to the coupling effect of the third capacitor C3, return to the voltage level that exceeds the voltage level of the system high voltage VDD. Hence, when the display voltages V_D1~V_Dn remain at the high voltage level (e.g., the system high voltage VDD) within plural frame periods of time, the second latch circuits LR2_1~LR2_*n* may ensure that the display voltages V_D1~V_Dn are consistently the system high voltages VDD and are not degraded together with time.

With the circuitry structure of the boost inverter, the transistor with a relatively small area may have a fast circuit response speed. Hence, in comparison with the normal inverter circuitry structure, the boost inverter circuitry structure may further save the circuit layout area. The inverter circuitry structure constituted by the third and fourth transistors M3 and M4 and the boost inverter circuitry structure constituted by the seventh, eighth, and ninth transistors M7, M8, and M9 are taken as examples. When the channel width-to-length (W/L) ratios of the third and fourth transistors M3 and M4 are 3500/4.5 and 35000/4.5, respectively, the circuit response time of the third and fourth transistors M3 and M4 is roughly equal to the circuit response time of the seventh, eighth, and ninth transistors M7, M8, and M9 if the channel W/L ratios of the seventh, eighth, and ninth transistors M7, M8, and M9 are 350/4.5, 3500/4.5, and 56/4.5, respectively. From the above comparison result, it can be learned that the boost inverter circuitry structure may lead to significant reduction of the circuit area.

Note that the inverter circuitry structure constituted by the third and fourth transistors M3 and M4 and shown in FIG. 3 may be replaced by the boost inverter circuitry structure constituted by the seventh, eighth, and ninth transistors M7, M8, and M9 and the third capacitor C3 in the second latch circuit LR2_1 or another similar boost inverter circuitry structure, which should not be construed as a limitation to the invention.

Figure 4:
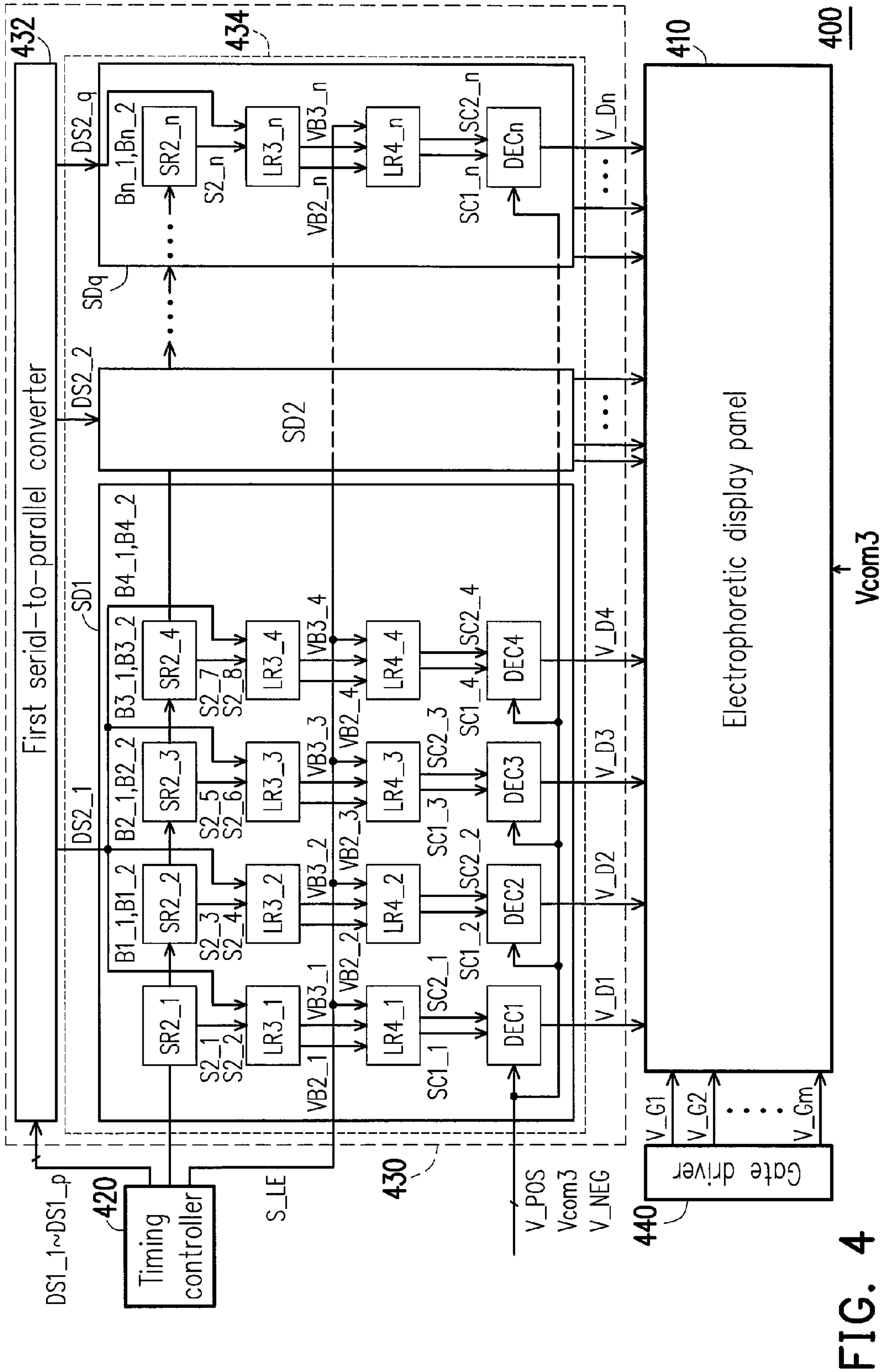
FIG. 4 is a schematic view illustrating an electrophoretic display system according to another embodiment of the invention.

FIG. 4 is a schematic view illustrating an electrophoretic display system according to another embodiment of the invention. With reference to FIG. 4, according to the present embodiment, a common voltage Vcom3 of the electrophoretic display panel 420 is assumed to be an direct current voltage. The electrophoretic display system 400 includes the electrophoretic display panel 410, a timing controller 420, a data driver 430, and a gate driver 440. Here, the electrophoretic display panel 410, the timing controller 420, and the gate driver 440 are similar to the electrophoretic display panel 110, the timing controller 120, and the gate driver 140 depicted in FIG. 1 and described in the previous embodiment, and therefore no further explanation is provided hereinafter.

To be specific, when the common voltage Vcom3 is the direct current voltage, the common voltage Vcom3 is the ground voltage, and the display voltages V_D1~V_Dn may be correspondingly at the positive voltage level, at the negative voltage level, or may be the ground voltage, so as to generate the positive voltage difference, the negative voltage difference, or the zero voltage difference in the electrophoretic display panel 410. Hence, the voltage level of the display voltages V_D1~V_Dn is determined at least by two bits. Besides, decoding circuits (e.g., DEC1~DECn) are configured in the data converter 430, so as to select one of the positive display voltage V_POS (i.e., the positive voltage level), the common voltage Vcom3, and the negative display voltage V_NEG (i.e., the negative voltage level) as one of the display voltages V_D1~V_Dn through the decoding circuits (e.g., DEC1~DECn).

According to the embodiment, the data driver 430 includes a first serial-to-parallel converter 432 and data converter 434, wherein the data converter 434 includes a plurality of second shift registers SR2_1~SR2_*n*, a plurality of third latch circuits LR3_1~LR3_n, a plurality of fourth latch circuits LR4_1~LR4_n, and a plurality of decoding circuits DEC1~DECn. Here, the second shift registers SR2_1~SR2_n, the third latch circuits LR3_1~LR3_n, the fourth latch circuits LR4_1~LR4_n, and the decoding circuits DEC1~DECn may be divided into a plurality of driving channels SD1~SDq (i.e., divided into a plurality of groups), and each of the driving channels SD1~SDq may respectively convert the second series data (e.g., DS2_1~DS2_q) received by the driving channels SD1~SDq and output the corresponding one of the display voltages (e.g., V_D1~V_Dn). For instance, the driving channel SD1 outputs the corresponding display voltages V_D1~V_D4 according to the second series data DS2_1 received by the driving channel SD1, and the same principle is applicable to the other driving channels. Since the first serial-to-parallel converter 432 is similar to the first serial-to-parallel converter 132 depicted in FIG. 1 and described in the previous embodiment, no further explanation is provided hereinafter.

According to the present embodiment, the second shift registers SR2_1~SR2_n may respectively provide corresponding second signals S2_1~S2_n, and the second signals (e.g., S2_1~S2_n) provided by the second shift registers (e.g., SR2_1~SR2_n) corresponding to the same driving channels (e.g., SD1~SDq) are sequentially enabled. For instance, one of the second signals S2_1~S2_8 provided by the second shift registers SR2_1~SR2_4 corresponding to the driving channel SD1 is enabled, and the second signals S2_1~S2_8 are sequentially enabled.

The third latch circuits LR3_1~LR3_n are electrically connected to the first serial-to-parallel converter 432, so as to respectively receive the corresponding one of the second series data DS2_1~DS2_q and respectively receive one of the second signals S2_1~S2_n. Besides, the third latch circuits LR3_1~LR3_n respectively latch the first data bits B1_1~Bn_1 and the second data bits B1_2~Bn_2 of the second series data DS2_1~DS2_q according to the corresponding second signals S2_1~S2_n and respectively output second bit voltages VB2_1~VB2_n and third bit voltages VB3_1~VB3_n.

The fourth latch circuits LR4_1~LR4_n are electrically connected to the third latch circuits LR3_1~LR3_n to respectively receive the corresponding second bit voltages VB2_1~VB2_n, the corresponding third bit voltages VB3_1~VB3_n, and the latch enabling signal S_LE provided by the timing controller 420. The fourth latch circuits LR4_1~LR4_n respectively latch the corresponding second bit voltages VB2_1~VB2_n and the corresponding third bit voltages VB3_1~VB3_n according to the latch enabling signal S_LE and respectively output first control signals SC1_1~SC1_n and second control signals SC2_1~SC2_n.

The decoding circuits DEC1~DECn are electrically connected to the fourth latch circuits LR4_1~LR4_n to receive the corresponding first control signals SC1_1~SC1_n and the corresponding second control signals SC2_1~SC2_n. Besides, the decoding circuits DEC1~DECn receive a positive display voltage V_POS, the common voltage V_COM, and a negative display voltage V_NEG. Besides, the decoding circuits DEC1~DECn select one of the positive display voltage V_POS, the common voltage V_COM, and the negative display voltage V_NEG as the corresponding one of the display voltages V_D1~V_Dn according to the corresponding first control signals SC1_1~SC1_n and the corresponding second control signals SC2_1~SC2_n.

For instance, in the exemplary driving channel SD1, the second shift registers SR2_1~SR2_4 belong to the same group and may respond to the timing signal (not shown) provided by the timing controller 420, so as to generate the second signals S2_1~S2_8 that are sequentially enabled. When the third latch circuits LR3_1~LR3_4 respectively latch the first data bits B1_1~B4_1 and the second data bits B1_2~B4_2 transmitted by the second series data DS2_1 at different time points, the third latch circuits LR3_1~LR3_4 output the second bit voltages VB2_1~VB2_4 and the third bit voltages VB3_1~VB3_n (corresponding to the first data bits B1_1~B4_1 and the second data bits B1_2~B4_2) in parallel to the fourth latch circuits LR4_1~LR4_4. Here, the second shift registers SR2_1~SR2_4 and the third latch circuits LR3_1~LR3_4 may be considered as a serial-to-parallel converter, so as to latch the first data bits B1_1~B4_1 and the second data bits B1_2~B4_2 transmitted by the second series data DS2_1 at different time points and output the second bit voltages VB2_1~VB2_4 and the third bit voltages VB3_1~VB3_n (corresponding to the first data bits B1_1~B4_1 and the second data bits B1_2~B4_2) in parallel to the fourth latch circuits LR4_1~LR4_4.

The fourth latch circuits LR4_1~LR4_4 respectively latch the corresponding second bit voltages VB2_1~VB2_4 according to the latch enabling signal S_LE and respectively output the first control signals SC1_1~SC1_4 and the second control signals SC2_1~SC2_4 in parallel when the latch enabling signal S_LE is enabled. Besides, according to the first control signals SC1_1~SC1_4 and the second control signals SC2_1~SC2_4 received by the decoding circuits DEC1~DEC4, the decoding circuits DEC1~DEC4 respectively select to output the positive display voltage V_POS, the common voltage V_COM, or the negative display voltage V_NEG as the display voltages V_D1~V_D4 to the electrophoretic display panel 410, so as to drive the electrophoretic display panel 410 to display the corresponding frames.

Besides, the driving channel SD1 described in the present embodiment exemplarily outputs four display voltages V_D1~V_D4, and the number of the second shift registers, the number of the third latch circuits, the number of the fourth latch circuits, and the number of the decoding circuits are all set to be four. However, the actual number of the display voltages output by each driving channel may be determined by a designer, and the circuits in each driving channel (SD1~SDq) may accordingly be changed according to the number of the output driving voltages, which should not be construed as a limitation to the invention.

In another embodiment, each of the second shift registers (ex. SR2_1~SR2_n) may respectively correspond to a plurality of third latch circuits (ex. LR3_1~LR3_n), and thereby each shift register may simultaneously or sequentially provide the second signals to the third latch circuits, i.e. each of the second shift registers may drive a plurality of third latch circuits. According to the above-described, the second series data (ex. DS2_1~DS2_q) received by the third latch circuits (ex. LR3_1~LR3_n) which driven by the same second shift register (ex. SR2_1~SR2_n) are different, i.e. the data lines corresponding to the third latch circuits (ex. LR3_1~LR3_n) which driven by the same second shift register (ex. SR2_1~SR2_n) are different, so that a product of amounts of the second shift registers and the data lines are equal to the data resolution (i.e. the amount of the display voltages, such as V_D1~V_Dn).

Figure 5:
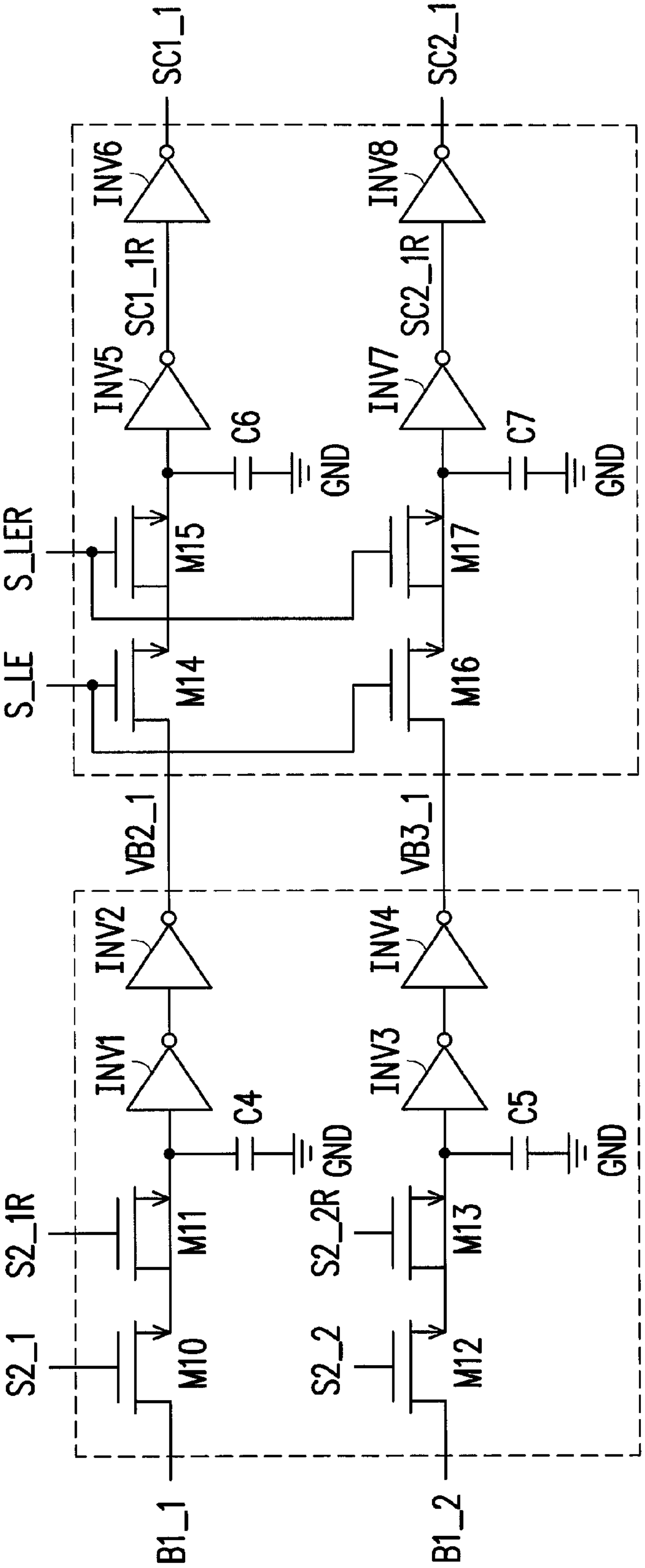
FIG. 5 is a schematic circuitry diagram illustrating a first latch circuit and a second latch circuit according to another embodiment of the invention.

FIG. 5 is a schematic circuitry diagram illustrating a first latch circuit and a second latch circuit according to another embodiment of the invention. With reference to FIG. 4 and FIG. 5, in the present embodiment, the driving channel SD1 exemplarily has the third latch circuit LR3_1 and the fourth latch circuit LR4_1, and the circuitry structures of the third latch circuits LR3_1~LR3_n and the fourth latch circuits LR4_1~LR4_n may be referred to as those of the third and fourth latch circuits LR3_1 and LR4_1.

As shown in FIG. 5, the third latch circuit LR3_1 includes a tenth transistor M10, an eleventh transistor M11, a fourth capacitor C4, a first inverter INV1, a second inverter INV2, a twelfth transistor M12, a thirteenth transistor M13, a fifth capacitor C5, a third inverter INV3, and a fourth inverter INV4. The drain (i.e., the first end) of the tenth transistor M10 receives the first data bit B11, and the gate (i.e., the control end) of the tenth transistor M10 receives the second signal S2_1. The drain (i.e., the first end) of the eleventh transistor M11 is electrically connected to the source (i.e., the second end) of the tenth transistor M10. The gate (i.e. the control end) of the eleventh transistor M11 receives an inverted signal S2_1R of the second signal S2_1. The source (i.e., the second end) of the eleventh transistor M11 is electrically connected to the drain of the eleventh transistor M11. The fourth capacitor C4 is electrically connected between the source of the tenth transistor M10 and the ground voltage GND.

An input end of the first inverter INV1 is electrically connected to the source of the tenth transistor M10. An input end of the second inverter INV2 is electrically connected to an output end of the first inverter INV1. An output end of the second inverter INV2 outputs the second bit voltage VB2_1.

The drain (i.e., the first end) of the twelfth transistor M12 receives the second data bit B12. The gate (i.e. the control end) of the twelfth transistor M12 receives the second signal S2_2. The drain (i.e., the first end) of the thirteenth transistor M13 is electrically connected to the source (i.e., the second end) of the twelfth transistor M12. The gate (i.e. the control end) of the thirteenth transistor M13 receives an inverted signal S2_2R of the second signal S2_2. The source (i.e., the second end) of the thirteenth transistor M13 is electrically connected to the drain of the thirteenth transistor M13. The fifth capacitor C5 is electrically connected between the source of the twelfth transistor M12 and the ground voltage GND.

An input end of the third inverter INV3 is electrically connected to the source of the twelfth transistor M12. An input end of the fourth inverter INV4 is electrically connected to an output end of the third inverter INV3. An output end of the fourth inverter INV4 outputs the third bit voltage VB3_1.

In the present embodiment, the tenth transistor M10 is controlled by the second signal S2_1, the twelfth transistor M12 is controlled by the second signal S2_2, the eleventh transistor M11 is controlled by the inverted signal S2_1R of the second signal S2_1, and the thirteenth transistor M13 is controlled by the inverted signal S2_2R of the second signal S2_2. Hence, the third latch circuit LR3_1 may receive the second series data DS2_1 through a data line and, in response to the second signals S2_1 and S2_2 and their inverted signals S2_1R~S2_2R, sequentially latch the first data bit B1_1 and the second data bit B1_2 transmitted by the second series data DS2_1 at different time points.

However, in another embodiment of the invention, the third latch circuit LR3_1 may be electrically connected to two data lines to receive two second series data (e.g., DS2_1~DS2_n), the tenth and twelfth transistors M10 and M12 are controlled by the same second signal (e.g., S2_1), and the eleventh and thirteenth transistors M11 and M13 are controlled by the inverted signal (e.g., S2_1R) of same second signal. Thereby, the third latch circuit LR3_1 may simultaneously receive and latch the first data bit B1_1 and the second data bit B12 respectively transmitted by the two second series data (e.g., DS2_1~DS2_n).

That is, the first serial-to-parallel converter 432 may serially output the second series data DS2_1~DS2_q (including the first data bits B1_1~Bn_1 and the second data bits B12~Bn_2) through the same data line, such that the third latch circuits LR3_1~LR3_n respectively receive the corresponding first data bits B1_1~Bn_1 and second data bits B1_2~Bn_2 of the second series data DS2_1~DS2_q.

Additionally, the first serial-to-parallel converter 432 may output the second series data DS2_1~DS2_q (corresponding to the first data bits B1_1~Bn_1 and the second data bits B1_2~Bn_2) in parallel through different data lines, such that the third latch circuits LR3_1~LR3_n simultaneously receive and latch the corresponding first data bits B11~Bn_1 and second data bits B12~Bn_2 of the second series data DS2_1~DS2_q. However, the invention is not limited to the embodiment depicted in FIG. 5 and described above.

The fourth latch circuit LR4_1 includes a fourteenth transistor M14, a fifteenth transistor M15, a sixteenth transistor M16, a seventeenth transistor M17, a sixth capacitor C6, a seventh capacitor C7, a fifth inverter INV5, a sixth inverter INV6, a seventh inverter INV7, and an eighth inverter INV8. The drain (i.e., the first end) of the fourteenth transistor M14 receives the second bit voltage VB2_1. The gate (i.e., the control end) of the fourteenth transistor M14 receives the latch enabling signal S_LE. The drain (i.e., the first end) of the fifteenth transistor M15 is electrically connected to the source (i.e., the second end) of the fourteenth transistor M14. The gate (i.e. the control end) of the fifteenth transistor M15 receives an inverted signal S_LER of the latch enabling signal S_LE. The source (i.e., the second end) of the fifteenth transistor M15 is electrically connected to the drain of the fifteenth transistor M15. The sixth capacitor C6 is electrically connected between the source of the fourteenth transistor M14 and the ground voltage GND.

An input end of the fifth inverter INV5 is electrically connected to the source of the fourteenth transistor M14. An output end of the fifth inverter INV5 outputs an inverted signal SC1_1R of the corresponding first control signal SC1_1. An input end of the sixth inverter INV6 is electrically connected to the output end of the fifth inverter INV5. An output end of the sixth inverter INV6 outputs the first control signal SC1_1.

The drain (i.e., the first end) of the sixteenth transistor M16 receives the third bit voltage VB3_1. The gate (i.e., the control end) of the sixteenth transistor M16 receives the latch enabling signal S_LE. The drain (i.e., the first end) of the seventeenth transistor M17 is electrically connected to the source (i.e., the second end) of the sixteenth transistor M16. The gate (i.e. the control end) of the seventeenth transistor M17 receives the inverted signal S_LER of the latch enabling signal S_LE. The source (i.e., the second end) of the seventeenth transistor M17 is electrically connected to the drain of the seventeenth transistor M17. The seventh capacitor C7 is electrically connected between the source of the sixteenth transistor M16 and the ground voltage GND.

An input end of the seventh inverter INV7 is electrically connected to the source of the sixteenth transistor M16. An output end of the seventh inverter INV7 outputs an inverted signal SC2_1R of the second control signal SC2_1. An input end of the eighth inverter INV8 is electrically connected to the output end of the seventh inverter INV7. An output end of the eighth inverter INV8 outputs the second control signal SC2_1.

According to said circuitry configuration, the fourth latch circuit LR4_1 may provide the first control signal SC1_1, the second control signal SC2_1, the inverted signal SC1_1R of the first control signal SC1_1, and the inverted signal SC2_1R of the second control signal SC2_1 to the decoding circuit DEC1, so as to control the decoding circuit DEC1 to generate the corresponding display voltage V_D1.

Figure 6:
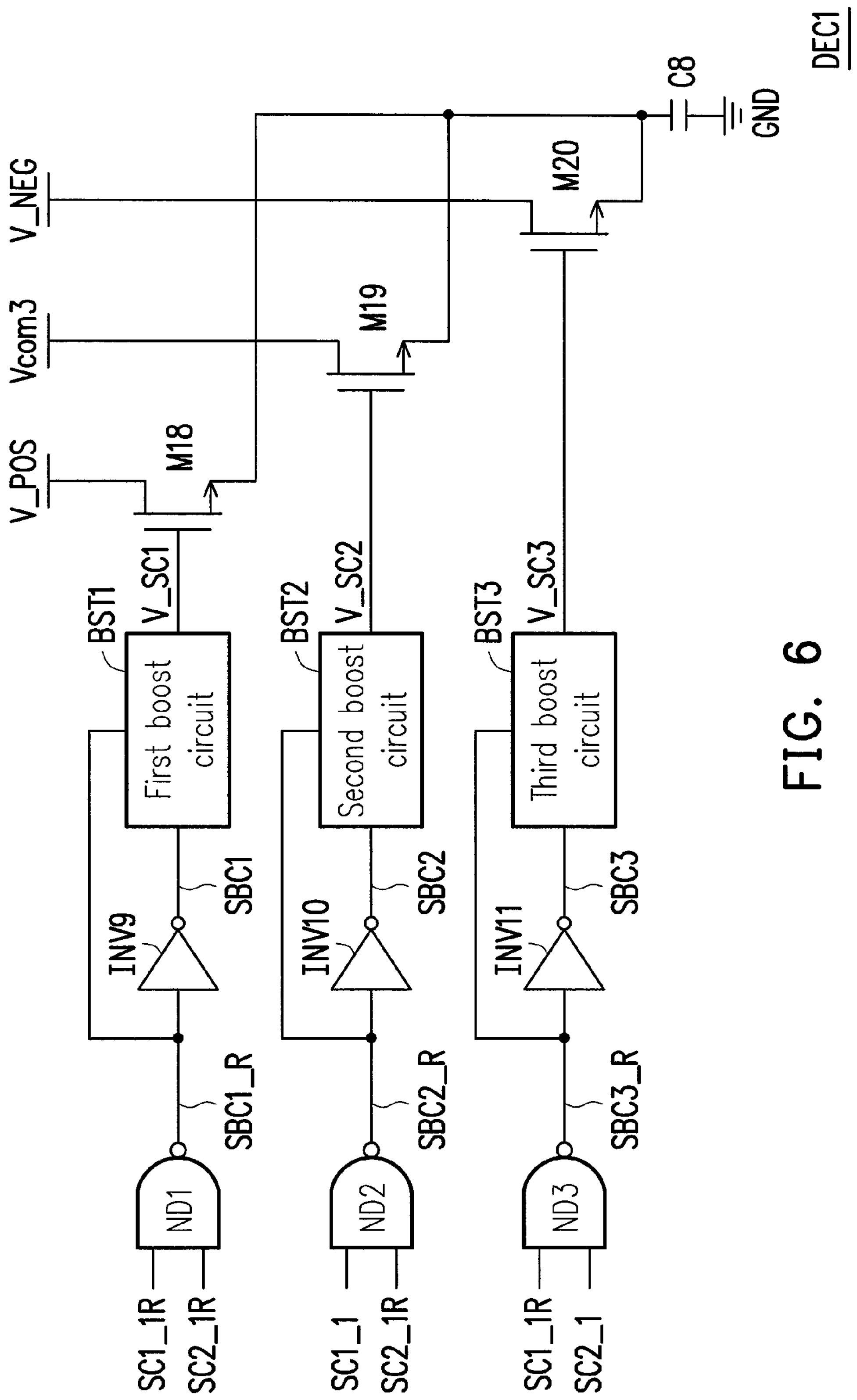
FIG. 6 is a schematic circuitry diagram illustrating a decoding circuit according to an embodiment of the invention.

FIG. 6 is a schematic circuitry diagram illustrating a decoding circuit according to an embodiment of the invention. With reference to FIG. 4 and FIG. 6, in the present embodiment, the decoding circuit DEC1 includes a first NAND gate ND1, a ninth inverter INV9, a first boost circuit BST1, an eighteenth transistor M18, an eighth capacitor C8, a second NAND gate ND2, a tenth inverter INV10, a second boost circuit BST2, a nineteenth transistor M19, a third NAND gate ND3, an eleventh inverter INV11, a third boost circuit BST3, and a twentieth transistor M20.

A first input end of the first NAND gate ND1 receives an inverted signal SC1_1R of the first control signal. A second input end of the first NAND gate ND1 receives an inverted signal SC2_1R of the second control signal. An output end of the first NAND gate ND1 outputs an inverted signal SBC1_R of a first boost control signal SBC1. An input end of the ninth inverter INV9 is electrically connected to the output end of the first NAND gate ND1. An output end of the ninth inverter INV9 outputs the first boost control signal SBC1.

The first boost circuit BST1 is electrically connected to the input end and the output end of the ninth inverter INV9, so as to output a first switch control voltage V_SC1 according to the first boost control signal SBC1 and the inverted signal SBC1_R of the first boost control signal SBC1. The drain (i.e., the first end) of the eighteenth transistor M18 receives the positive display voltage V_POS. The gate (i.e., the control end) of the eighteenth transistor M18 is electrically connected to the first boost circuit BST1 to receive the first switch control voltage V_SC1.

A first input end of the second NAND gate ND2 receives the first control signal SC1_1. A second input end of the second NAND gate ND1 receives the inverted signal SC2_1R of the second control signal. An output end of the second NAND gate ND2 outputs an inverted signal SBC2_R of a second boost control signal SBC2. An input end of the tenth inverter INV10 is electrically connected to the output end of the second NAND gate ND2. An output end of the tenth inverter INV10 outputs the second boost control signal SBC2.

The second boost circuit BST2 is electrically connected to the input end and the output end of the tenth inverter INV10, so as to output a second switch control voltage V_SC2 according to the second boost control signal SBC2 and the inverted signal SBC2_R of the second boost control signal SBC2.

The drain (i.e., the first end) of the nineteenth transistor M19 receives the common voltage Vcom3. The gate (i.e., the control end) of the nineteenth transistor M19 is electrically connected to the second boost circuit BST2 to receive the second switch control voltage V_SC2. The source (i.e., the second end) of the nineteenth transistor M19 is electrically connected to the source (i.e., the second end) of the eighteenth transistor M18.

A first input end of the third NAND gate ND3 receives the inverted signal SC1_1R of the first control signal. A second input end of the third NAND gate ND3 receives the second control signal SC2_1. An output end of the third NAND gate ND3 outputs an inverted signal SBC3_R of a third boost control signal SBC3. An input end of the eleventh inverter INV11 is electrically connected to the output end of the third NAND gate ND3. An output end of the eleventh inverter INV11 outputs the third boost control signal SBC3.

The third boost circuit BST3 is electrically connected to the input end and the output end of the eleventh inverter INV11, so as to output a third switch control voltage V_SC3 according to the third boost control signal SBC3 and the inverted signal SBC3_R of the third boost control signal SBC3.

The drain (i.e., the first end) of the twentieth transistor M20 receives the negative display voltage V_NEG. The gate (i.e., the control end) of the twentieth transistor M20 is electrically connected to the third boost circuit BST3 to receive the third switch control voltage V_SC3. The source (i.e., the second end) of the twentieth transistor M20 is electrically connected to the source of the eighteenth transistor M18.

The eighth capacitor C8 is electrically connected between the sources of the eighteen, nineteenth, and twentieth transistors M18, M19, and M20 and the ground voltage GND, so as to provide the display voltage V_D1.

For instance, when the first control signal SC1_1 and the second control signal SC2_1 are both disabled (i.e., the inverted signals SC1_1R and SC2_1R are both enabled), the first boost circuit BST1 responds to the first boost control signal SBC1 and its inverted signal SBC1_R and outputs the enabled first switch control voltage V_SC1, so as to switch on the eighteenth transistor M18. At this time, the second boost circuit BST2 and the third boost circuit BST3 respectively output the disabled second switch control voltage V_SC2 and the disabled third switch control voltage V_SC3, so as to switch off the nineteenth transistor M19 and the twentieth transistor M20. Therefore, the eighth capacitor C8 may store the power according to the positive display voltage V_POS and may thereby provide the positive display voltage V_POS as the display voltage V_D1. Namely, given that the first control signal SC1_1 and the second control signal SC2_1 are both disabled, the decoding circuit DEC1 selects the positive display voltage V_POS as the display voltage V_D1.

When the first control signal SC1_1 is enabled and the second control signal SC2_1 is disabled, the second boost circuit BST2 responds to the second boost control signal SBC2 and its inverted signal SBC2_R and outputs the enabled second switch control voltage V_SC2, so as to switch on the nineteenth transistor M19. At this time, the first boost circuit BST1 and the third boost circuit BST3 respectively output the disabled first switch control voltage V_SC1 and the disabled third switch control voltage V_SC3, so as to switch off the eighteenth transistor M18 and the twentieth transistor M20. Thereby, the decoding circuit DEC1 selects the common voltage Vcom3 as the display voltage V_D1.

When the first control signal SC1_1 is disabled and the second control signal SC2_1 is enabled, the third boost circuit BST3 responds to the third boost control signal SBC3 and its inverted signal SBC3_R and outputs the enabled third switch control voltage V_SC3, so as to switch on the twentieth transistor M20. At this time, the first boost circuit BST1 and the second boost circuit BST2 respectively output the disabled first switch control voltage V_SC1 and the disabled second switch control voltage V_SC2, so as to switch off the eighteenth transistor M18 and the nineteenth transistor M19. Thereby, the decoding circuit DEC1 selects the negative display voltage V_NEG as the display voltage V_D1.

The corresponding relation between the disabling and enabling states of the first and second control signals SC1_1 and SC1_2 and the display voltage V_D1 is exemplified in the present embodiment and should not be construed as a limitation to the invention.

Figure 7:
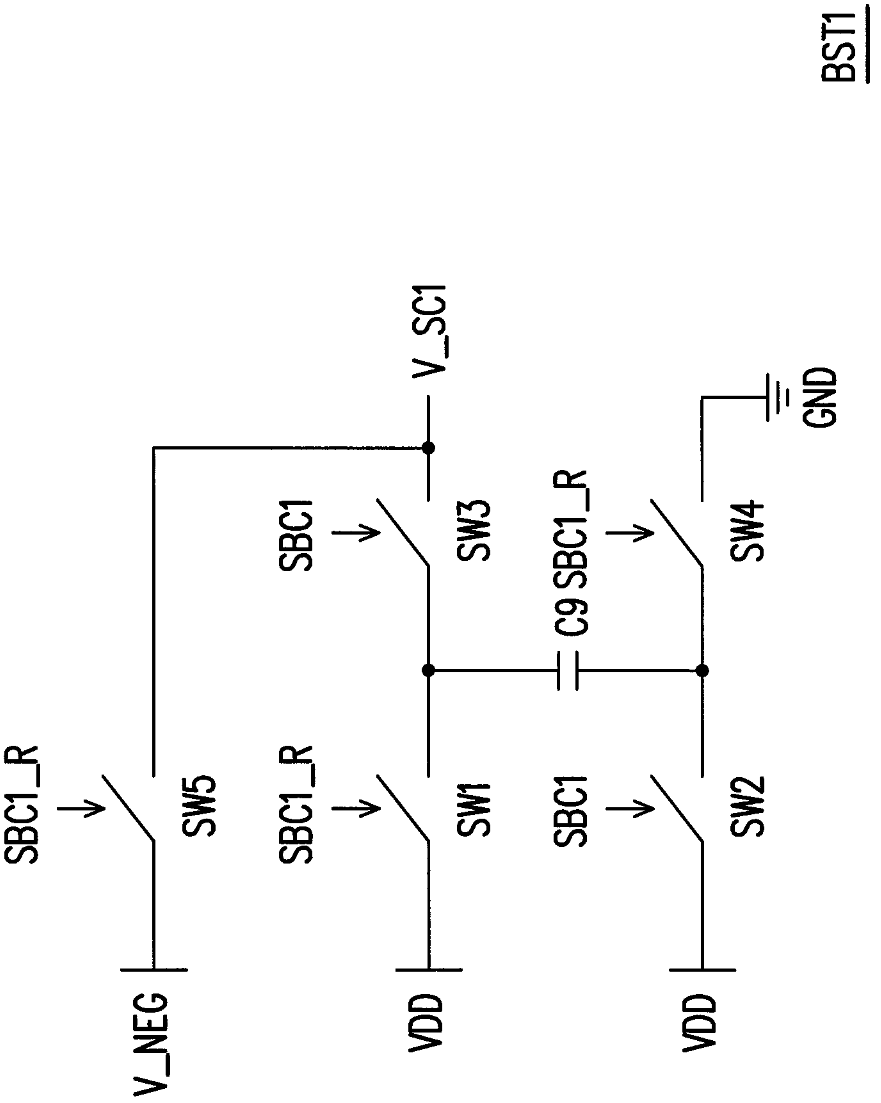
FIG. 7 is a schematic circuitry diagram illustrating a boost circuit according to an embodiment of the invention.

FIG. 7 is a schematic circuitry diagram illustrating a boost voltage circuit according to an embodiment of the invention. With reference to FIG. 6 and FIG. 7, the first boost circuit BST1 is exemplified herein to explain the circuitry structures of the first boost circuit BST1, the second boost circuit BST2, and the third boost circuit BST3. As shown in FIG. 7, the first boost circuit BST1 includes a ninth capacitor C9, a first switch SW1, a second switch SW2, a third switch SW3, a fourth switch SW4, and a fifth switch SW5.

A first end of the first switch SW1 receives the system high voltage VDD. A second end of the first switch SW1 is electrically connected to a first end of the ninth capacitor C9. Here, the first switch SW1 is controlled by the inverted signal SBC1_R of the first boost control signal SBC1 and is switched on.

A first end of the second switch SW2 receives the system high voltage VDD. A second end of the second switch SW2 is electrically connected to a second end of the ninth capacitor C9. Here, the second switch SW2 is controlled by the first boost control signal SBC1 and is switched on.

A first end of the third switch SW3 is electrically connected to the first end of the ninth capacitor C9. A second end of the third switch SW3 provides the first switch control voltage V_SC1. Here, the third switch SW3 is controlled by the first boost control signal SBC1 and is switched on.

A first end of the fourth switch SW4 is electrically connected to the second end of the ninth capacitor C9. A second end of the fourth switch SW4 receives the ground voltage GND. Here, the fourth switch SW4 is controlled by the inverted signal SBC1_R of the first boost control signal SBC1 and is switched on.

A first end of the fifth switch SW5 receives the negative display voltage V_NEG. A second end of the fifth switch SW5 is electrically connected to the second end of the third switch SW3. Here, the fifth switch SW5 is controlled by the inverted signal SBC1_R of the first boost control signal SBC1 and is switched on.

With reference to FIG. 6 and FIG. 7, in the first boost circuit BST1, when the first boost control signal SBC1 is disabled, the first switch SW1, the fourth switch SW4, and the fifth switch SW5 respectively respond to the enabled inverted signal SBC1_R and are switched on, and the second switch SW2 and the third switch SW3 respectively respond to the disabled first boost control signal SB1 and are switched off. At this time, the first boost circuit BST1 provides the negative display voltage V_NEG as the first switch control voltage V_SC1, and thereby the eighteenth transistor M18 is switched off. In addition, the ninth capacitor C9 takes advantages of the system high voltage VDD to stores power, i.e., the voltage across the ninth capacitor C9 is equal to the system high voltage VDD.

When the first boost control signal SBC1 is enabled, the second switch SW2 and the third switch SW3 respectively respond to the enabled first boost control signal SB1 and are switched on, and the first switch SW1, the fourth switch SW4, and the fifth switch SW5 respectively respond to the disabled inverted signal SBC1_R and are switched off. At this time, the first switch control voltage V_SC1 output by the first boost circuit BST1 is raised to twice the system high voltage VDD according to the power stored by the ninth capacitor C9, so as to increase the conduction degree of the eighteenth transistor M18.

The circuitry structure and the operation manner of the first boost circuit BST1 are similar to those of the second and third boost circuits BST2 and BST3. Namely, the second and third boost circuits BST2 and BST3 may respectively take advantages of the corresponding second boost control signal SBC2 and its inverted signal SBC2_R and the corresponding third boost control signal SBC3 and its inverted signal SBC3_R to control the conduction state of the corresponding switches. That is, in the second boost circuit BST2, the first, fourth, and fifth switches SW1, SW4, and SW5 are controlled by the inverted signal SBC2_R and are switched on, and the second and third switches SW2 and SW3 are controlled by the second boost control signal SBC2 and are switched on. In the third boost circuit BST3, the first, fourth, and fifth switches SW1, SW4, and SW5 are controlled by the inverted signal SBC3_R and are switched on, and the second and third switches SW2 and SW3 are controlled by the third boost control signal SBC3 and are switched on.

As a result, the second switch control voltage V_SC2 and the third switch control voltage V_SC3 may be further raised by the second boost circuit BST2 and the third boost circuit BST3, and thereby the conduction degree of the nineteenth transistor M19 and the conduction degree of the twentieth transistor M20 may then increase.

Even in consideration of the boost mechanism of the boost circuits BST1 to BST3, the voltage across the capacitor C9 is lowered down together with time, which correspondingly lowers down the conduction degree of the transistors M18, M19, and M20. Thereby, the voltage level and the current of the display voltage V_D1 gradually decrease. Hence, in the present embodiment similar to the embodiment shown in FIG. 3, due to the coupling effect of the ninth capacitor C9 in the boost circuits BST1~BST3 within the VB period, the first, second, and third switch control voltages V_SC1, V_SC2, and V_SC3 are re-coupled to exceed the voltage level of the system high voltage VDD, and thereby favorable boost effects accomplished by the boost circuits BST1~BST3 may be guaranteed.

Specifically, the timing controller 420 may set the first series data DS1_1~DS1_*p* within the VB period, such that each of the decoding circuits DEC1~DECn in turns outputs the positive display voltage V_POS, the common voltage Vcom3, and the negative display voltage V_NEG. Owing to the re-coupling effect of the ninth capacitor C9 in the first, second, and third boost circuits BST1~BST3, the boost effects accomplished by the first, second, and third boost circuits BST1~BST3 are not influenced by time.

To sum up, an electrophoretic display system is provided in an embodiment of the invention, and the data driver of the electrophoretic display system receives data through serial-to-parallel conversion. Thereby, the timing controller may transmit data through a relatively small number of data lines, the overall circuit area of the electrophoretic display system may be effectively reduced, and the hardware costs may be reduced as well. From another perspective, the electrophoretic display system respectively provides the electrophoretic display panel (respectively driven by the direct current and the alternating current) with the latch circuits and the decoding circuits which are characterized by the boost mechanism, so as to enhance the driving capability of the data driver in no need of expanding the width of the transistors.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electrophoretic display system comprising:
an electrophoretic display panel;
a timing controller;
a data driver comprising:
a first serial-to-parallel converter electrically connected to the timing controller to receive a plurality of first series data and convert the first series data into a plurality of second series data, wherein the quantity of the second series data is more than the quantity of the first series data; and a data converter electrically connected to the first serial-to-parallel converter to receive the second series data, the data converter being electrically connected to the electrophoretic display panel and converting the second series data into a plurality of display voltages, wherein the quantity of the display voltages is more than the quantity of the second series data; and a gate driver electrically connected to the electrophoretic display panel and the timing controller and controlled by the timing controller to provide a plurality of gate driving voltages to the electrophoretic display panel, wherein a common voltage of the electrophoretic display panel is an alternating current voltage, and wherein the data converter comprises:

a plurality of first latch circuits electrically connected to the first serial-to-parallel converter to respectively receive a corresponding second series data of the second series data, each of the first latch circuits respectively receiving a first signal, latching one of data bits in the second series data according to a corresponding first signal of the first signals, and respectively outputting a first bit voltage;

a plurality of second latch circuits electrically connected to the first latch circuits to respectively receive the corresponding first bit voltage and receive a latch enabling signal, and each of the second latch circuits, according to the latch enabling signal, respectively latching the corresponding first bit voltage and respectively outputting a corresponding display voltage of the display voltages; and a plurality of first shift registers for respectively providing the corresponding first signal, wherein the first shift registers are divided into a plurality of groups, and the first signals provided by the first shift registers belonging to the same group are sequentially enabled.

2. The electrophoretic display system as recited in claim 1, wherein each of the first latch circuits comprises:

a first transistor, a first end of the first transistor receiving the corresponding second series data, a control end of the first transistor receiving the corresponding first signal;

a second transistor, a first end of the second transistor being electrically connected to a second end of the first transistor, a control end of the second transistor receiving an inverted signal of the corresponding first signal, a second end of the second transistor being electrically connected to the first end of the second transistor;

a first capacitor electrically connected between the second end of the first transistor and a ground voltage;

a third transistor, a first end of the third transistor receiving a system high voltage, a control end of the third transistor being electrically connected to the first end of the third transistor, a second end of the third transistor outputting the corresponding first bit voltage; and a fourth transistor, a first end of the fourth transistor being electrically connected to the second end of the third transistor, a control end of the fourth transistor being electrically connected to the second end of the first transistor, a second end of the fourth transistor receiving a system low voltage.

3. The electrophoretic display system as recited in claim 2, wherein each of the second latch circuits comprises:

a fifth transistor, a first end of the fifth transistor being electrically connected to one of the first latch circuits to receive the corresponding first bit voltage, a control end of the fifth transistor receiving the latch enabling signal;

a sixth transistor, a first end of the sixth transistor being electrically connected to a second end of the fifth transistor, a control end of the sixth transistor receiving an inverted signal of the latch enabling signal, a second end of the sixth transistor being electrically connected to the first end of the sixth transistor;

a second capacitor electrically connected between the second end of the fifth transistor and the ground voltage;

a seventh transistor, a first end of the seventh transistor receiving the system high voltage, a second end of the seventh transistor outputting the corresponding display voltage;

an eighth transistor, a first end of the eighth transistor being electrically connected to the second end of the seventh transistor, a control end of the eighth transistor being electrically connected to the second end of the fifth transistor, a second end of the eighth transistor receiving the system low voltage;

a third capacitor electrically connected between a control end of the seventh transistor and the second end of the seventh transistor; and a ninth transistor, a first end of the ninth transistor receiving the system high voltage, a control end of the ninth transistor being electrically connected to the first end of the ninth transistor, a second end of the ninth transistor being electrically connected to the control end of the seventh transistor.

4. The electrophoretic display system as recited in claim 1, wherein the timing controller sets the first series data within a vertical blank period, such that the data bit received by each of the first latch circuits respectively corresponds to a system low voltage.

5. An electrophoretic display system comprising:

an electrophoretic display panel;

a timing controller;

a data driver comprising:

a first serial-to-parallel converter electrically connected to the timing controller to receive a plurality of first series data and convert the first series data into a plurality of second series data, wherein the quantity of the second series data is more than the quantity of the first series data; and a data converter electrically connected to the first serial-to-parallel converter to receive the second series data, the data converter being electrically connected to the electrophoretic display panel and converting the second series data into a plurality of display voltages, wherein the quantity of the display voltages is more than the quantity of the second series data; and a gate driver electrically connected to the electrophoretic display panel and the timing controller and controlled by the timing controller to provide a plurality of gate driving voltages to the electrophoretic display panel, wherein a common voltage of the electrophoretic display panel is a direct current voltage, and wherein the data converter comprises:

a plurality of third latch circuits electrically connected to the first serial-to-parallel converter to respectively receive a corresponding second series data of the second series data, each of the third latch circuits respectively receiving a plurality of second signals, respectively latching a first data bit and a second data bit of the corresponding second series data according to the corresponding second signal, and respectively outputting a second bit voltage and a third bit voltage;

a plurality of fourth latch circuits electrically connected to the third latch circuits to respectively receive the corresponding second bit voltage and the corresponding third bit voltage and receive a latch enabling signal, and each of the fourth latch circuits, according to the latch enabling signal, respectively latching the corresponding second bit voltage and the corresponding third bit voltage and respectively outputting a first control signal and a second control signal; and a plurality of decoding circuits electrically connected to the fourth latch circuits to respectively receive the corresponding first control signal and the corresponding second control signal, each of the decoding circuits receiving a positive display voltage, the common voltage, and a negative display voltage and selecting one of the positive display voltage, the common voltage, and the negative display voltage as the corresponding display voltage according to the corresponding first control signal and the corresponding second control signal.

6. The electrophoretic display system as recited in claim 5, wherein the data converter further comprises a plurality of second shift registers for respectively providing the corresponding second signals, wherein the second shift registers are divided into a plurality of groups, and the second signals provided by the second shift registers belonging to the same group are sequentially enabled.

7. The electrophoretic display system as recited in claim 5, wherein each of the third latch circuits comprises:

a tenth transistor, a first end of the tenth transistor receiving the corresponding first data bit, a control end of the tenth transistor receiving the corresponding second signal;

an eleventh transistor, a first end of the eleventh transistor being electrically connected to a second end of the tenth transistor, a control end of the eleventh transistor receiving an inverted signal of the corresponding second signal, a second end of the eleventh transistor being electrically connected to the first end of the eleventh transistor;

a fourth capacitor electrically connected between the second end of the tenth transistor and a ground voltage;

a first inverter, an input end of the first inverter being electrically connected to the second end of the tenth transistor;

a second inverter, an input end of the second inverter being electrically connected to an output end of the first inverter, an output end of the second inverter outputting the corresponding second bit voltage;

a twelfth transistor, a first end of the twelfth transistor receiving the corresponding second data bit, a control end of the twelfth transistor receiving the corresponding second signal;

a thirteenth transistor, a first end of the thirteenth transistor being electrically connected to a second end of the twelfth transistor, a control end of the thirteenth transistor receiving an inverted signal of the corresponding second signal, a second end of the thirteenth transistor being electrically connected to the first end of the thirteenth transistor;

a fifth capacitor electrically connected between the second end of the twelfth transistor and the ground voltage;

a third inverter, an input end of the third inverter being electrically connected to the second end of the twelfth transistor; and a fourth inverter, an input end of the fourth inverter being electrically connected to an output end of the third inverter, an output end of the fourth inverter outputting the corresponding third bit voltage.

8. The electrophoretic display system as recited in claim 7, wherein each of the fourth latch circuits comprises:

a fourteenth transistor, a first end of the fourteenth transistor receiving the corresponding second data bit, a control end of the fourteenth transistor receiving the latch enabling signal;

a fifteenth transistor, a first end of the fifteenth transistor being electrically connected to a second end of the fourteenth transistor, a control end of the fifteenth transistor receiving an inverted signal of the latch enabling signal, a second end of the fifteenth transistor being electrically connected to the first end of the fifteenth transistor;

a sixth capacitor electrically connected between the second end of the fourteenth transistor and the ground voltage;

a fifth inverter, an input end of the fifth inverter being electrically connected to the second end of the fourteenth transistor, an output end of the fifth inverter outputting an inverted signal of the corresponding first control signal;

a sixth inverter, an input end of the sixth inverter being electrically connected to the output end of the fifth inverter, an output end of the sixth inverter outputting the corresponding first control signal;

a sixteenth transistor, a first end of the sixteenth transistor receiving the corresponding third data bit, a control end of the sixteenth transistor receiving the latch enabling signal;

a seventeenth transistor, a first end of the seventeenth transistor being electrically connected to a second end of the sixteenth transistor, a control end of the seventeenth transistor receiving an inverted signal of the latch enabling signal, a second end of the seventeenth transistor being electrically connected to the first end of the seventeenth transistor;

a seventh capacitor electrically connected between the second end of the sixteenth transistor and the ground voltage;

a seventh inverter, an input end of the seventh inverter being electrically connected to the second end of the sixteenth transistor, an output end of the seventh inverter outputting an inverted signal of the corresponding second control signal;

an eighth inverter, an input end of the eighth inverter being electrically connected to the output end of the seventh inverter, an output end of the eighth inverter outputting the corresponding second control signal.

9. The electrophoretic display system as recited in claim 8, wherein each of the decoding circuits comprises:

a first NAND gate, a first input end of the first NAND gate receiving an inverted signal of the corresponding first control signal, a second input end of the first NAND gate receiving an inverted signal of the corresponding second control signal, an output end of the first NAND gate outputting an inverted signal of a first boost control signal;

a ninth inverter, an input end of the ninth inverter being electrically connected to the output end of the first NAND gate, an output end of the ninth inverter outputting the first boost control signal;

a first boost circuit electrically connected to the input end and the output end of the ninth inverter, so as to output a first switch control voltage according to the first boost control signal and the inverted signal of the first boost control signal;

an eighteenth transistor, a first end of the eighteenth transistor receiving the positive display voltage, a control end of the eighteenth transistor being electrically connected to the first boost circuit to receive the first switch control voltage;

an eighth capacitor electrically connected between a second end of the eighteenth transistor and the ground voltage to provide the corresponding display voltages of the display voltage;

a second NAND gate, a first input end of the second NAND gate receiving the corresponding first control signal, a second input end of the second NAND gate receiving an inverted signal of the corresponding second control signal, an output end of the second NAND gate outputting an inverted signal of a second boost control signal;

a tenth inverter, an input end of the tenth inverter being electrically connected to the output end of the second NAND gate, an output end of the tenth inverter outputting the second boost control signal;

a second boost circuit electrically connected to the input end and the output end of the tenth inverter, so as to output a second switch control voltage according to the second boost control signal and the inverted signal of the second boost control signal;

a nineteenth transistor, a first end of the nineteenth transistor receiving the common voltage, a control end of the nineteenth transistor being electrically connected to the second boost circuit to receive the second switch control voltage, a second end of the nineteenth transistor being electrically connected to a second end of the eighteenth transistor;

a third NAND gate, a first input end of the third NAND gate receiving an inverted signal of the corresponding first control signals, a second input end of the third NAND gate receiving the corresponding second control signals, an output end of the third NAND gate outputting an inverted signal of a third boost control signal;

an eleventh inverter, an input end of the eleventh inverter being electrically connected to the output end of the third NAND gate, an output end of the eleventh inverter outputting the third boost control signal;

a third boost circuit electrically connected to the input end and the output end of the eleventh inverter, so as to output a third switch control voltage according to the third boost control signal and the inverted signal of the third boost control signal; and a twentieth transistor, a first end of the twentieth transistor receiving the negative display voltage, a control end of the twentieth transistor being electrically connected to the third boost circuit to receive the third switch control voltage, a second end of the twentieth transistor being electrically connected to the second end of the eighteenth transistor.

10. The electrophoretic display system as recited in claim 9, wherein each of the first boost circuit, the second boost circuit, and the third boost circuit comprises:

a ninth capacitor;

a first switch, a first end of the first switch receiving a system high voltage, a second end of the first switch being electrically connected to the first end of the ninth capacitor, the first switch being controlled by the inverted signal of the first boost control signal, the inverted signal of the second boost control signal, or the inverted signal of the third boost control signal and being switched on;

a second switch, a first end of the second switch receiving the system high voltage, a second end of the second switch being electrically connected to the second end of the ninth capacitor, the second switch being controlled by the first boost control signal, the second boost control signal, or the third boost control signal and being switched on;

a third switch, a first end of the third switch being electrically connected to the first end of the ninth capacitor, a second end of the third switch providing the first switch control voltage, the second switch control voltage, or the third switch control voltage, the third switched being controlled by the first boost control signal, the second boost control signal, or the third boost control signal and being switched on;

a fourth switch, a first end of the fourth switch being electrically connected to the second end of the ninth capacitor, a second end of the fourth switch receiving the ground voltage, the fourth switch being controlled by the inverted signal of the first boost control signal, the inverted signal of the second boost control signal, or the inverted signal of the third boost control signal and being switched on; and a fifth switch, a first end of the fifth switch receiving the negative display voltage, a second end of the fifth switch being electrically connected to the second end of the third switch, the fifth switch being controlled by the inverted signal of the first boost control signal, the inverted signal of the second boost control signal, or the inverted signal of the third boost control signal and being switched on.

11. The electrophoretic display system as recited in claim 10, wherein the timing controller sets the first series data within a vertical blank period, such that each of the decoding circuits in turns outputs the positive display voltage, the common voltage, and the negative display voltage.

* * * * *